US009917821B2

(12) United States Patent
Gillmore et al.

(10) Patent No.: US 9,917,821 B2
(45) Date of Patent: Mar. 13, 2018

(54) HARDWARE CRYPTOGRAPHIC AUTHENTICATION

(71) Applicant: Itron, Inc., Liberty Lake, WA (US)

(72) Inventors: Matthew Keith Gillmore, Jackson, MI (US); James Marcus Otting, Bend, OR (US)

(73) Assignee: ITRON, INC., Liberty Lake, WA (US)

( * ) Notice: Subject to any disclaimer, the term of this patent is extended or adjusted under 35 U.S.C. 154(b) by 31 days.

(21) Appl. No.: 14/983,274

(22) Filed: Dec. 29, 2015

(65) Prior Publication Data
US 2017/0187699 A1 Jun. 29, 2017

(51) Int. Cl.
*H04L 29/06* (2006.01)
*H04W 12/06* (2009.01)

(52) U.S. Cl.
CPC .......... *H04L 63/062* (2013.01); *H04L 63/067* (2013.01); *H04L 63/08* (2013.01); *H04W 12/06* (2013.01)

(58) Field of Classification Search
CPC ... H04L 63/08; H04L 63/067; H04L 63/0853; H04L 63/0869; H04L 63/0281; H04L 63/10; H04L 63/062; H04W 12/06
USPC ........................................................ 713/171
See application file for complete search history.

(56) References Cited

U.S. PATENT DOCUMENTS

| 6,292,472 B1 | 9/2001 | Rariden et al. |
| 2004/0025173 A1 | 2/2004 | Levonai et al. |
| 2005/0182843 A1 | 8/2005 | Reistad et al. |
| 2006/0072582 A1 | 4/2006 | Bronnimann et al. |
| 2009/0178138 A1* | 7/2009 | Weiss .................... G06F 21/577 726/22 |
| 2012/0246473 A1* | 9/2012 | Oba ........................ H04L 9/321 713/168 |

(Continued)

FOREIGN PATENT DOCUMENTS

WO 2016203455 A1 12/2016

OTHER PUBLICATIONS

Fouda, Mostafa M., et al. "A lightweight message authentication scheme for smart grid communications." IEEE Transactions on Smart Grid 2.4 (2011): 675-685.*

(Continued)

*Primary Examiner* — Syed Zaidi

(57) ABSTRACT

An example method of establishing an authenticated session between two communicating devices includes establishing, by a first processor of a first device, a secure connection with a second device over the network using a communications protocol; receiving, by the first processor, an identity authentication request from the second device; passing, by the first processor, the identity authentication request to a second processor located on an authentication chip of the first device; generating, by the second processor using one or more authentication code functions stored on the authentication chip, one or more authentication codes using a unique serial number of the first device and an authentication key, both stored on the authentication chip; providing, by the second processor, the one or more generated authentication codes to the first processor; and sending, by the first processor, a response to the second device that includes the one or more generated authentication codes.

24 Claims, 17 Drawing Sheets

(56) References Cited

U.S. PATENT DOCUMENTS

2014/0122580 A1* 5/2014 Nuaimi .............. H04L 63/0281
                                                    709/203
2016/0330201 A1* 11/2016 Nguyen-Huu .......... H04L 63/10

OTHER PUBLICATIONS

Detken, Kai-Oliver, et al. "Integrity protection in a smart grid environment for wireless access of smart meters." Wireless Systems within the Conferences on Intelligent Data Acquisition and Advanced Computing Systems: Technology and Applications (IDAACS-SWS), 2014 2nd International Symposium on. IEEE, 2014.*

"Atmel ATSHA204—CryptoAuthentication Family of Hardware Security Solutions," copyright 2012, Atmel Corporation, 2 pages.

"Atmel CryptoAuthentication Product Uses—Atmel ATSHA204," Application Note, dated Dec. 2012, copyright 2012, Atmel Corporation, 12 pages.

"ATSHA204A—Atmel CryptoAuthentication—Data Sheet," dated Nov. 2015, copyright 2015, Atmel Corporation, 82 pages.

"Smart Object Guidelines—IPSO Alliance," Starter Pack 1.0 Abstract, found at <http://www.ipso-alliance.org/smart-object-guidelines/>, printed Dec. 23, 2015, copyright 2015, 4 pages.

Ben-Kiki, O. et al., "YAML Ain't Markup Language (YAMLTM) Version 1.2," 3rd Edition, Patched at Oct. 1, 2009, found at <http:www.yaml.org/spec/1.2/spec.html>, printed Dec. 23, 2015, copyright 2001-2009, 80 pages.

Hartke, K., "Observing Resources in CoAP—draft-ietf-core-observe-16," CoRE Working Group, Internet-Draft, found at <http://tools.ietf.org/html/draft-ietf-core-observe-16>, printed Dec. 23, 2015, dated Dec. 30, 2014, 35 pages.

Keoh, S. et al., "DTLS-based Multicast Security in Constrained Environments—draft-keoh-dice-multicast-security-08," DICE Working Group, Internet-Draft, found at <http://www.ietf.org/archive/id/draft-keoh-dice-multicast-security-08.txt>, printed Dec. 23, 2015, dated Jul. 3, 2014, 20 pages.

Rescorla, E. et al., "Datagram Transport Layer Security Version 1.2," Request for Comments 6347, Internet Engineering Task Force (IETF), found at <http://tools.ietf.org/html/rfc6347>, printed Dec. 23, 2015, dated Jan. 2012, 33 pages.

Shelby, Z. et al., "The Constrained Application Protocol (CoAP)," Request for Comments 7252, Internet Engineering Task Force (IETF), found at <http://tools.ietf.org/html/rfc7252>, printed Dec. 23, 2015, dated Jun. 2014, 113 pages.

Shelby, Z., "Constrained RESTful Environments (CoRE) Link Format," Request for Comments 6690, Internet Engineering Task Force (IETF), found at <http://tools.ietf.org/html/rfc6690>, printed Dec. 23, 2015, dated Aug. 2012, 23 pages.

Wouters, P. et al., "Using Raw Public Keys in Transport Layer Security (TLS) and Datagram Transport Layer Security (DTLS)," Request for Comments 7250, Internet Engineering Task Force (IETF), found at <http://tools.ietf.org/html/rfc7250>, printed Dec. 23, 2015, dated Jun. 2014, 19 pages.

PCT International Search Report and Written Opinion dated Mar. 24, 2017, for PCT International Patent Application No. PCT/US2016/067545, 15 pages.

Van Der Stok et al., "CoAP Management Interface; draft-vanderstok-core-comi-08," Internet Engineering Task Force (IETF), Internet Society (ISOC), Geneva, Switzerland, Oct. 16, 2015, pp. 1-74.

Marx, Anna-Lena, "Android Sensor Integration Part 2: Sensor Readings," Inovex Blog, Dec. 11, 2015, at <https://www.inovex.de/blog/android-sensor-integration-part-2-sensor-readings/>, 5 pages.

Anonymous, "Constrained Application Protocol—Wikipedia," Nov. 19, 2015, at <https://en.wikipedia.org/w/index.php?title=Constrained_Application_Protocol&oldid=691395715>, 5 pages.

Anonymous, "Raspberry Pi—View topic—Sharing my use of I2C GPIOs—Raspberry Pi Forums," May 5, 2014, at <https://www.raspberrypi.org/forums/viewtopic.php7f=448d=76468>, 17 pages.

Non-Final Office Action dated Oct. 5, 2017, for U.S. Appl. No. 14/983,244, 17 pages.

* cited by examiner

HARDWARE CRYPTOGRAPHIC AUTHENTICATION

FIELD OF THE DISCLOSURE

This disclosure relates generally to networked or cloud-based resource management and communication systems.

BACKGROUND

As more and more "smart" devices are being developed, the need to interconnect them grows. The so-called "Internet of Things" (IoT) is an environment in which objects (even including, but not limited to, animals or people) are given unique identifiers and are able to transfer data over a network, with or without interaction. This concept has evolved from technologies such as wireless communications, micro-electromechanical systems (MEMS), and the Internet. In recent years, the IoT has exploded, with sensors and basic control systems constituting a large portion of the market. The IoT technical space has rapidly grown, with already hundreds of competing standards, technologies, and platforms. However, key considerations have not always been taken into account. For example, as IoT networks grow, so do security threats. In addition, with the rapid growth of the market, it is difficult to predict all future needs and requirements. Of the existing IoT platforms available currently, some may offer varying levels of security and extensibility, but many, if not all, of these require a high level of programming knowledge to build and compile software from scratch or require the use of limited software development kits (SDKs) that may not even be in a language familiar to many developers.

Figure 1:
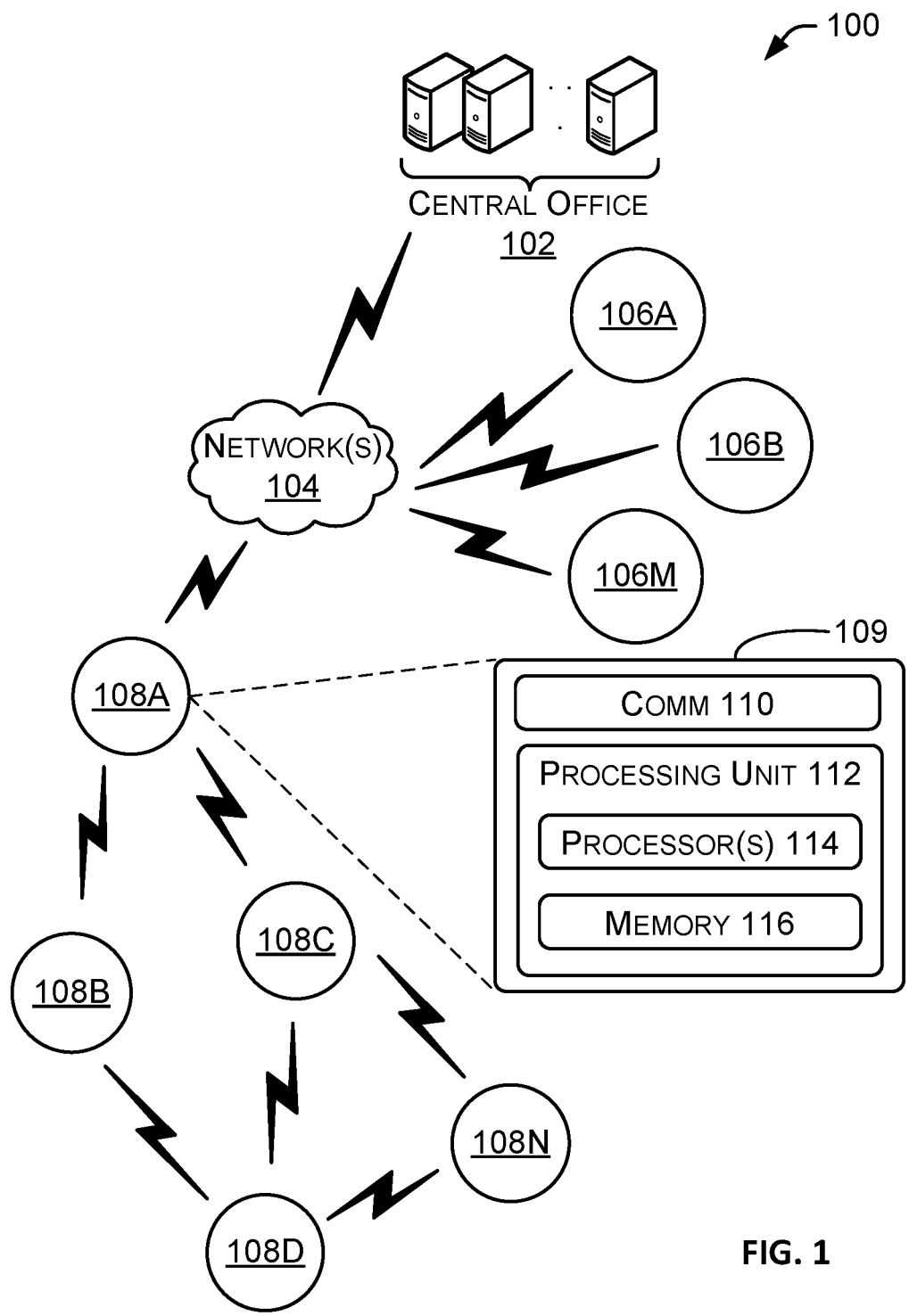
FIG. 1 is an illustration of an example IoT network environment in which example methods, apparatus, and articles of manufacture disclosed herein may be implemented, according to an embodiment of this disclosure.

In the drawings, the leftmost digit(s) of a reference number may identify the drawing in which the reference number first appears.

DETAILED DESCRIPTION

While there are many IoT solutions currently being developed, there remains a need for a more unified, secure, and easily extensible platform. The following description discloses various technology aspects of an IoT platform that are directed to that end. For example, device communication is handled by agent software running on each resource management device, where data collection, command-and-control messages, registration, firmware updates, etc., may be managed in a unified system with end-to-end security. An abstraction layer may allow the agent software to be extended with new resource devices, from the simplest of sensors to complex control systems. Integrating new devices may be accomplished easily via basic configuration files or via scripts using any language and/or tools with which a developer is familiar. To further unify the platform, current or developing standards may also be incorporated.

A core of the platform includes agent software running on each resource management device, which is extended by a modular abstraction layer, as further described below. In general, networks of IoT devices may be managed by a web user interface (UI) hosted in the cloud. For the purposes of this disclosure, however, the nature of the management UI is irrelevant. The IoT communication architecture makes no distinction between an endpoint (e.g., a node, device, etc.) in the cloud, or any other device on the network.

As further described below, the agent software may serve several purposes, including, for example, data transport, security/encryption, device authentication, access control list management and enforcement, interpretation and execution of abstraction layer configuration, firmware/software transfer/upgrades, service directory/indexing, basic device configuration and health management, etc.

In embodiments discussed in this disclosure, each device may be directly addressable from any other device on the network, and this may be done without network address translation (NAT) or proxy services. The embodiments disclosed herein may be implemented on any IP-based network. In embodiments, Internet Protocol Version 6 (IPv6) may be used, as it provides address space (both public and private) to allow globally unique addresses for the potential billions of IoT devices that may be deployed worldwide in the upcoming decade. In embodiments, IPv6 multicast groups may also be utilized. To reach networks that are not IPv6-ready, supplemental solutions (such as VPN tunneling) may be used. Embodiments disclosed herein are not limited to IPv6, however, as other routing protocol solutions may be used (e.g., IPv4, RPL (Routing Protocol for Low Power and Lossy Networks), etc.), as would be understood by one of ordinary skill in the relevant arts. For the purposes of this description, any routing protocol may be used that will provide a seamless network fabric that will allow data packets to be routed directly from any node to any other on a global scale (with the possible exception of nodes under firewalls or other measures designed intentionally to segregate networks for security).

Data Transport

In embodiments described herein, data transport may be accomplished using a data transport protocol, such as, for example, Constrained Application Protocol (CoAP). CoAP is a User Datagram Protocol (UDP)-based protocol that features a subset of Hypertext Transfer Protocol (HTTP) functionality and is designed for use in IoT and other constrained resource environments. CoAP uses Uniform Resource Identifiers (URIs) (paths) in a method similar to HTTP. URIs are convenient because they are human readable, instantly recognizable, hierarchical, and extensible. Layout and organization of resource devices is therefore easy to arrange into meaningful relationships, such that, for example, object properties or configuration parameters are exposed in ways that are easily understandable. If used, anything configurable, readable, or writable by the agent software may be part of the URI schema. Any resource devices (e.g., sensors, actuators, etc.), controls, configuration parameters, etc., may be exposed as resource URIs. CoAP also is useful as a resource discovery tool, as it can provide a richly formatted listing of all resource devices managed by a resource management device, including metadata about the resource devices, such as resource type, human readable titles, and interface descriptions. Another useful feature of CoAP is its proposed "Observe" option extension, which extends the basic GET method in a way that can be thought of as "subscribing" to a URI. Using this feature, a client (such as a cloud data store, for example) that wants continual updates of device (e.g., sensor) data does not have to poll a device repeatedly. Instead, an initial request can be sent, indicating observation, and the device itself is responsible for sending further updates (e.g., whenever the resource device's state changes, etc.). By extending the URI schema with parameters for thresholds or minimal intervals, for example, minimizing network resource device usage can be accomplished. CoAP also defines how it interacts in multicast environments and has its own registered "All CoAP Nodes" variable scope multicast address. In networks with large numbers of homogeneous (or nearly homogeneous) devices, multicast can reduce network overhead considerably, as well as facilitate device discovery. This functionality may be useful for group management functions (e.g., to turn on all the lights in a particular group), firmware updates/transfers, device discovery, etc. While CoAP has many advantages, the data transport protocol used is not limited to CoAP, as other data transport protocols may be used (e.g., HTTP, HTTPS (HTTP Secure), MQTT (MQ Telemetry Transport), AMQP (Advanced Message Queueing Protocol), XMPP (Extensible Messaging and Presence Protocol), etc.), as would be understood by one of ordinary skill in the relevant arts.

Transport Security

Transport security is another important aspect of an IoT solution. An example of a transport security implementation that may be used in the disclosed IoT platform is Datagram Transport Layer Security (DTLS). DTLS is an extension of Transport Layer Security (TLS) for use with unreliable transports such as UDP. DTLS can do for UDP and CoAP what TLS (and previously, Secure Sockets Layer (SSL)) does for HTTP. While DTLS has many useful features, some desired features may need to be provided as modifications. For example, raw public keys may be incorporated. Raw keys are not signed, and therefore cannot be authenticated directly, so other authentication methods (such as described below) may be needed. Another example of a potential modification to DTLS is one that would allow its use with multicast. Multicast is a communication method in which a transmitted single data packet can be replicated to multiple receivers. While DTLS is provided here as an example, the transport security method used is not limited to DTLS, as other transport security solutions may be used.

In many current security solutions, certificates are used to verify whether or not one communicating device can trust another communicating device. However, with the vast number of devices potentially communicating in an IoT environment, it is difficult to manage such a large number of certificates. In the description below, embodiments of a hardware cryptographic authentication solution are described that use a unique device serial number and an encrypted key that is written once and cannot be read by the host operating system. In one embodiment, this is accomplished with a hardware dongle, such that device identity can be guaranteed without the need to maintain a classic certificate authority structure, or embedding unique certificates or keys in firmware of each device at manufacturing time.

The device authentication discussed above (and described in detail below) should also integrate with the chosen transport security implementation (e.g., DTLS, etc.). In one example of how this may be accomplished, raw public and private key pairs may be generated on a device (and may be regenerated on demand) initially to establish a secure transport session. Once the session is secured, each device may verify the identity of each other via the hardware authentication solution described herein. If each device is verified by the other, then the communication session may be considered authenticated for the device serial numbers in use. In embodiments, this authentication may last for the life of the session. In an embodiment, the communicating devices may also optionally exchange sub-device IDs in addition to serial numbers. Sub-device IDs may indicate different applications or users sharing the same physical device, but which may need to have separate access controls in place for security and/or permission reasons. When multiple users and/or applications need to have simultaneous access on a device, a new transport session may be used for each device serial number and sub-device ID combination. This may be particularly important for privilege separation in a multi-user interface such as a central web management server.

Permissions

With the transport layer secured, and the identity (and optionally user/application) of the session endpoint verified, another aspect of security to take into account may include determining what permissions a given session should have on a per-resource level, for example. One way of accomplishing this is through use of access control lists (ACLs).

ACLs may be provided for any resource (e.g., via a URI, etc.) and method (GET, PUT, POST, DELETE, etc.) combination for any particular resource device. ACLs can be keyed to the device serial number (and optionally to the device serial number/sub-device ID combination). The transport security method in use for a device's communications may also be associated with a specific device serial number (and possibly sub-device ID), which will allow an ACL to be checked for every request. ACL inheritance (i.e., applying a rule to a resource and all of its children) and/or wildcards/matching rules may also be supported. ACLs may be managed remotely, by any other device/user that has the appropriate permissions to update the ACLs. In this way, there does not need to be a central authority that has control. Rather, any device/user that is allowed access to, for example, "PUT" or "POST" new ACLs to the ACL control resource may change the access rules on a device, depending on the set permissions.

A "cloud" server may be used as a web-based device management system. This system may allow configuration changes to be pushed to devices individually or en masse (see below). It may also monitor devices for basic health and network status, and may allow "browsing" devices and their resources. A cloud server is similar to any other node in the IoT network. It may use the same communications and security protocols, may provide the same type of resource scheme, and may have its own hardware cryptographic chip and device identity. One difference, however, is that the default ACL that is provided with device firmware may have all access granted to the cloud server device. That may allow further ACLs and other updates to be pushed to devices from the cloud. The default firmware on new devices may also designate the cloud server as a "check-in" server in order to register with the network.

One special application of ACLs will be for multicast use. ACL rules for a resource device may be created to allow multicast to that resource device, separate from other (e.g., unicast) rules. In the ACL storage itself, such rules may provide a multicast address/group that should be joined by the device to listen, the group key/cipher specification to be used, the address of the allowed/expected sender(s) using that key/cipher, etc. As an example, a group of individual IoT lights in an auditorium may all be administratively grouped so that they can be turned on/off simultaneously. Once the group is created, the controlling system (e.g., from in the cloud) may update the ACLs on the grouped devices, adding the new multicast ACL for the on/off and other lighting-related features of the devices, authorizing itself (and optionally a switch/control/input device) as a sender, and providing a key cipher. After this initial configuration, broadcast messages may be sent to the new multicast address by either a central control or the switch device, and the messages may be decrypted by the individual devices using the key/cipher in the ACL. The messages may then be processed and the command (e.g., turning the lights on or off) may be executed.

Abstraction Layer

Resource management and the ability to easily allow new IoT resources to be mapped into the URI space provided by the agent software of a resource management device may be accomplished by an abstraction layer in the herein described IoT platform, according to embodiments. The abstraction layer can allow resource devices operating on a variety of different interfaces (e.g., I2C, GPIO, A2D, etc.) to be accessible as URI resources that may be accessed from transport protocols (e.g., CoAP, HTTP, etc.). The abstraction layer may accomplish this using a configuration file which may directly provide basic metadata for simple resource devices (e.g., basic sensors) that may already be supported by well-known drivers (e.g., Linux kernel drivers, etc.). However, for more complex systems (e.g., serial control of a power inverter, etc.), more complex URIs may be mapped, and processing may be extended using custom software programs. In an embodiment, the custom software programs may be written in any language. Abstraction configurations may be provided during firmware provisioning, or may be updated/changed/removed through data transport management URIs, for example. A benefit of this abstraction layer is the ability to easily change a resource devices abstraction properties with a configuration change without the need for re-compilation, etc.

In embodiments, abstraction layer configurations, and resource handler programs, format data in a standardized manner. In this way, similar types of resource devices (e.g., similar types of sensors or other data sources, etc.) can be read and their information parsed in a homogeneous fashion. For example, all readings from temperature sensors may be provided as a floating point value in degrees Celsius, with metadata describing range and accuracy. In this way, the underlying physical device and drivers become irrelevant to the rest of the IoT platform, and all similar temperature sensors may be treated identically by upstream services (e.g., data collection, analytics, and/or other services). Some configuration examples handled by the abstraction layer follow.

A basic configuration example may involve a digital temperature sensor. The digital temperature sensor may already have drivers provided by Linux, for example. The digital temperature sensor may provide a temperature in Celsius in a virtual file at a specific location (e.g., /sys/bus/i2c/devices/i2c-1/0-50/temp1_input). This location may specify the location from which requested data may be retrieved by a handler unit, for example. The associated URI configuration may look like, for example:

```
URI:   /sensor/temp/1/celsius
       method: GET
           handler: "cat /sys/bus/i2c/devices/i2c-1/0-50/temp1_input"
           handler_io: stdio_plain
           content_type: text/plain
           interface: sensor_ro
           unit: temp/Celsius
           min: −30.00
           max: 140.00
           accuracy: 0.025
```

In this example, a GET to the URI may be handled by running the Linux "cat" program with the argument of the device file. The command may read the contents of that virtual file to standard output. With handler_io set to stdio_plain, the agent expects input/output through the standard input/output system, in plain (i.e., unstructured) format. That is, the output may be passed directly into the payload of a CoAP response, for example. The remainder of the configuration shown above may provide metadata (e.g., for the CoAP system) for both directory services and resource discovery (e.g., this is a sensor type interface, defined to be readable in units Celsius), for example, as well as content types for the actual payload. Other types of resource devices, such as a webcam, for example, may return a binary payload of a jpeg image or other arbitrary data, but may still be configured in this basic way.

Controls may also be utilized with the basic input/output handler model discussed above. Consider the following example involving a light:

```
URI:   /control/light/1/on
       method: PUT
           handler: "echo $payload > /sys/bus/i2c-1/0-55/relay1_output"
           handler_io: stdio_args
           content_type: text/plain
           interface: boolean
           payload:
               type: boolean
```

In this example, an additional feature of input sanitization is shown. A configuration file may specify expected input types and ranges, as well as more general regular expressions, by which input may be checked or sanitized prior to being passed as an argument to a program, for example. Here, by defining an expected payload as a boolean, the payload can be verified by agent software, and if it is anything other than a 0 or 1, an error can be returned to the client device that made the request. If the payload is valid, it can be passed as an argument to the control program. In this case, the control program is an "echo", meaning no code is needed. URI parameters (e.g., query strings) can be sanitized in a similar manner, as shown in the example below:

```
URI:   /control/light/1
       method: PUT
           handler: "/opt/bin/update-light.pl $on \
               -o $overheat_temp \
               -n $name \
               -b $brightness"
           handler_io: stdio_args
           input_parameters:
               on:
                   type: boolean
               name:
                   type: string
                   max_length: 50
               overheat_temp:
                   type: float
                   min: -25.5
                   max: 98.6
               brightness:
                   type: string
                   regex: "(ON|OFF|HIGH|LOW)"
```

For this example, a valid request may then look like, for example: coap://node-17/control/light/1?on=1&name=Light1&overheat_temp=50.0&brightness=LOW. If desired, the raw payload may be passed to stdin without sanitization (e.g., using stdio_plain functionality), and input sanitization may be left to the handler program.

A more complex example may involve communicating over a serial interface with a solar power inverter, for example. Obtaining a reading from a solar power inverter may involve sending several commands, parsing responses, etc. More advanced tasks (e.g., taking a panel offline, reconfiguring other panels to balance the system, etc.) may be quite complex. Some serial interfaces may involve navigating a human-readable menu, for example, or searching through pages of output to obtain the requested value. These complex tasks may be abstracted into an external program. An example of this type of configuration may look like:

```
URI:   /inverter/configure
       method: POST
           handler: "/opt/solar_control.py"
           handler_io: stdio_yaml
           interface: brandx_inverter
```

In this example, a structured data object is passed, with a result (e.g., payload) and other information that is available about the request. Standard input/output may still be used but it may be formatted as a standard data object. In this example, it is formatted as a YAML object. YAML is a human readable data format. While this example refers to a YAML data object, it should be understood by those of ordinary skill in the relevant art that this is not to be limiting, as other data formats may also be used (e.g., JavaScript Object Notation ((JSON), etc.). Further to this example, the payload of the request (e.g., a CoAP request) may be arbitrary, but may be wrapped in a standardized object (e.g., a YAML object) that also provides metadata about the request. This metadata may include, for example, identification of the client initiating the request, transport security metadata (e.g., cipher strength, lifetime, etc.), the URI and method, any URI-based parameters (e.g., query string), any other relevant information, etc. The external program is then free to process the payload (and metadata) as needed. Upon completion, the program may be expected to return its own structured data object (e.g., its own YAML object) through standard output. That structured data object may then define the response, including, for example, the content type, headers, the payload, etc., and may indicate success, or any valid error codes and/or other responses.

From the above examples, standardized parameters used for data retrieval/configuration may include, but are not to be limited to, for example, uniform resource identifiers (URIs), method types, handler definitions, input/output definitions, content types, interface types, unit types, minimum indicators, maximum indicators, accuracy indicators, etc. Standardized parameters used for activation/configuration may include, but are not to be limited to, for example, uniform resource identifiers (URIs), method types, handler definitions, input/output definitions, content types, interface types, payload types, one or more input parameters, types of each input parameter, maximum indications for one or more input parameters, minimum indications for one or more input parameters, type options, etc. The standardized parameter definitions used by the abstraction layer may be provided to, changed, or removed from a resource management device by way of updates to the agent software of the resource management device. In an embodiment, the standardized definitions used by the abstraction layer may be provided to, changed, or removed from a resource management device via use of one or more URIs.

Resource Observation

As mentioned earlier, at least one data transport protocol (e.g., CoAP) has "Observe" functionality. In embodiments, the abstraction layer may handle observations in various ways. In one example, a handler program for the observe method can be directly specified, and can run continuously, emitting a new payload every time a data value is retrieved, every time a resource device's value changes, every time a new payload meets specified criteria or is in accordance with a specified observation condition (e.g., meets/exceeds a set threshold that may be, for example, specified in the request or via configuration), etc. In an embodiment, data retrieval and/or emission may occur according to a specified time interval. A new payload may be provided to the agent software, and may subsequently be provided to any clients that may have requested observation. In another example, observation may be simulated by the agent software itself. In this example, the agent may call the URIs GET method, for example, and store the payload. A minimum polling interval may be defined in a configuration file, and the agent may execute the GET handler at that interval (or more or less frequently, if requested by a client, for example), comparing the newly returned payload to the cached value. If there is a change beyond a threshold (which may also be defined in the configuration file), this change may be transmitted in a message to the observing clients. For large payloads, a hash of the payload may be stored and compared, rather than the payload itself, to avoid memory exhaustion.

The abstraction layer and also the above-introduced hardware cryptographic authentication will be described in more detail below, with examples.

Embodiments are now described with reference to the figures, where like reference numbers may indicate identical or functionally similar elements. While specific configurations and arrangements are discussed, it should be understood that this is done for illustrative purposes only. A person skilled in the relevant art will recognize that other configurations and arrangements can be used without departing from the spirit and scope of the description. It will be apparent to a person skilled in the relevant art that this can also be employed in a variety of other systems and applications other than what is described herein.

FIG. 1 illustrates an example IoT network environment 100, according to an embodiment of this disclosure. In an example, and for ease of describing the embodiments herein, IoT network environment 100 may be an advanced meter infrastructure (AMI) network or other similar network. Environment 100 may include a central office 102, which may be associated with a data processing entity (e.g., a utility company in the case of an AMI network). The central office may communicate through one or more networks 104, which may be the Internet or other network having widespread or local functionality. Data collectors or client devices 106A-106M (collectively, clients 106) may be configured to communicate with a plurality of downstream devices. In the example shown, a plurality of network nodes, such as endpoints 108A-108N (collectively, endpoints 108) may be configured in a mesh network, star network or other configuration. One or more of the endpoints 108 may be configured for communication with one or more client devices 106 via network(s) 104. In an embodiment, an endpoint device 108 may also be configured as a data collector device 106. In an embodiment, endpoints 108 may access network(s) 104 via a routing or gateway device (not shown). While in this example, client devices 106 are shown as network nodes, in other embodiments, client devices 106 may be located at the central office and/or may be embodied in mobile data collection devices. In an example operation, a client device 106 may request data or send a command (e.g., a configuration command, an execution command, etc.) or other communications to one or more endpoints 108. In an AMI network example, requested data may include consumption information (e.g., associated with an electric, gas or water meter), sensor information (e.g., temperature readings, flow rate information, leak detection information, etc.), etc. Additionally, one or more client devices 106 may send software updates, firmware updates, instructions or other information to one or more endpoints 108.

In an expanded view, a simplified block diagram 109 shows various main components of an example endpoint 108A. Endpoint 108A may include a communication system 110 and a processing unit 112. Communication system 110 may include communication interface(s) that may be implemented in hardware or a combination of hardware and software, and may provide wired or wireless network interface(s) to one or more networks, such as network(s) 104 of FIG. 1. Communication interface(s) may be a part of, or connected with, an interface circuit and/or may include or connect with communication devices such as a transmitter, a receiver, a transceiver, a modem and/or network interface card to facilitate exchange of data with another devices. Network connectivity (e.g., local area networking (LAN), wide area networking (WAN), etc.) may be provided by one or more of Fiber, Ethernet, cellular 3G, 4G, 4G LTE, WiMAX, satellite, etc. Processing unit 112 may include one or more processors 114 and a memory 116. All of these components of endpoint 108A contribute to allowing communications to and from endpoint 108A. This block diagram is also representative of similar components that may comprise an example client device 106 and similarly contribute to allowing communications to and from a client device 106. In fact, as stated above, in embodiments of this disclosure, which can be implemented in a cloud-based environment, an endpoint device 108 may be configured to act as a client device 106, and vice versa.

Figure 2:
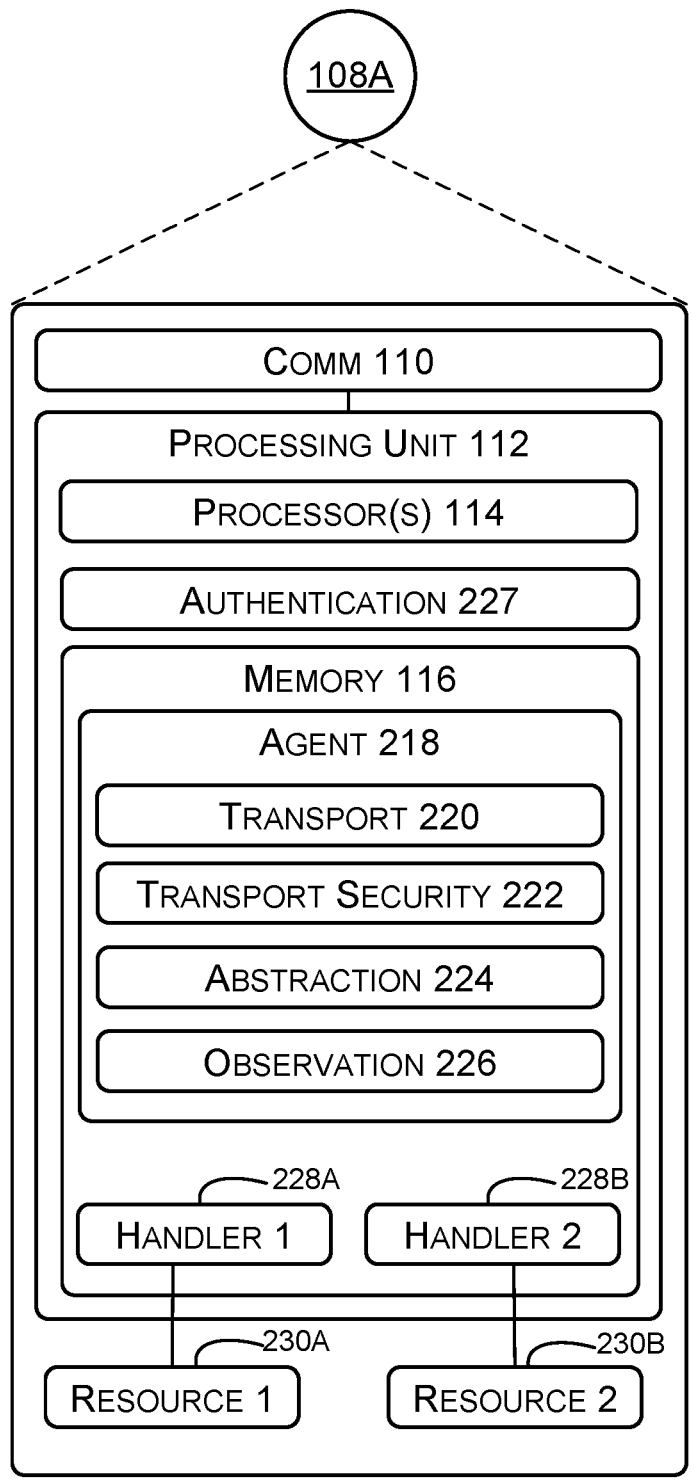
FIG. 2 is a block diagram representative of example device 108A from FIG. 1, according to an embodiment of this disclosure.

FIG. 2 illustrates a further expanded view of components of an example endpoint device 108A, according to an embodiment of this disclosure. As was shown in FIG. 1, endpoint device 108A may include communication system 110, processing unit 112, one or more processors 114, and memory 116. Memory 116 may include agent software module 218, which, when executed by processor(s) 114, may control communications with client devices 106 (FIG. 1), and manage its associated resource devices, using a transport module 220, a transport security module 222, an abstraction module 224, and optionally an observation module 226, as described in more detail below. Transport module 220 manages data transport using a data transport protocol (e.g., CoAP, or other data transport protocol, as discussed earlier in this document). Transport security module 222 manages communications security using a transport security protocol (e.g., DTLS, or other transport security protocol, as discussed earlier in this document). Abstraction module 224 handles the management of the substance of the communications to and from resource devices associated with endpoint device 108A, which serves to standardize the information passed to and from the resource devices and in turn easily extends the capabilities to incorporate more, and new, resource devices. Abstraction module 224 will be described in more detail in the following paragraphs. Agent software module 218 may optionally include observation module 226 for observations of associated resource devices as described above and further described below. Processing unit 112 may optionally further include an authentication unit 227, for further authentication beyond what may be provided by transport security module 222. Authentication unit 227 will be further described below. For the handling of each associated resource device, processing unit 112 may include one or more handler units (e.g., handler unit 228A and 228B), each associated with one or more resource devices associated with endpoint device 108A (e.g., resource devices 230A and 230B). Resource devices may include, for example, sensors, actuators, or any other device capable of one or more controllable and/or data providing functions. Examples of sensors may include, but are not to be limited to, temperature sensors, meters (e.g., water, electric, gas, oil, etc.), leak detection sensors, motion sensors, light brightness sensors, air quality sensors, solar panel error detection sensors, etc. Examples of actuators may include, but are not to be limited to, utility valve controllers, street light controllers, traffic light controllers, solar panel controllers, heating/ventilation/air conditioning (HVAC) controllers, etc. Many other types of sensors and actuators may also be contemplated. Different types of resource devices (e.g., sensors and actuators) may also work in conjunction with one another. In FIG. 2, only two resource devices are shown as being associated with endpoint device 108A. This is by way of example and not limitation, as any number of resource devices may be associated with an endpoint device. Similarly, in FIG. 2, two handler units are shown by way of example and not limitation. Any number of handler units and any number of resource devices may be associated with an endpoint device. In addition, a single handler unit may manage more than once resource device. For purposes of the description herein, an endpoint device such as endpoint device 108A may be referred to herein as a resource management device that manages resources such as its (here shown) associated resource devices 230A and 230B.

Figure 3:
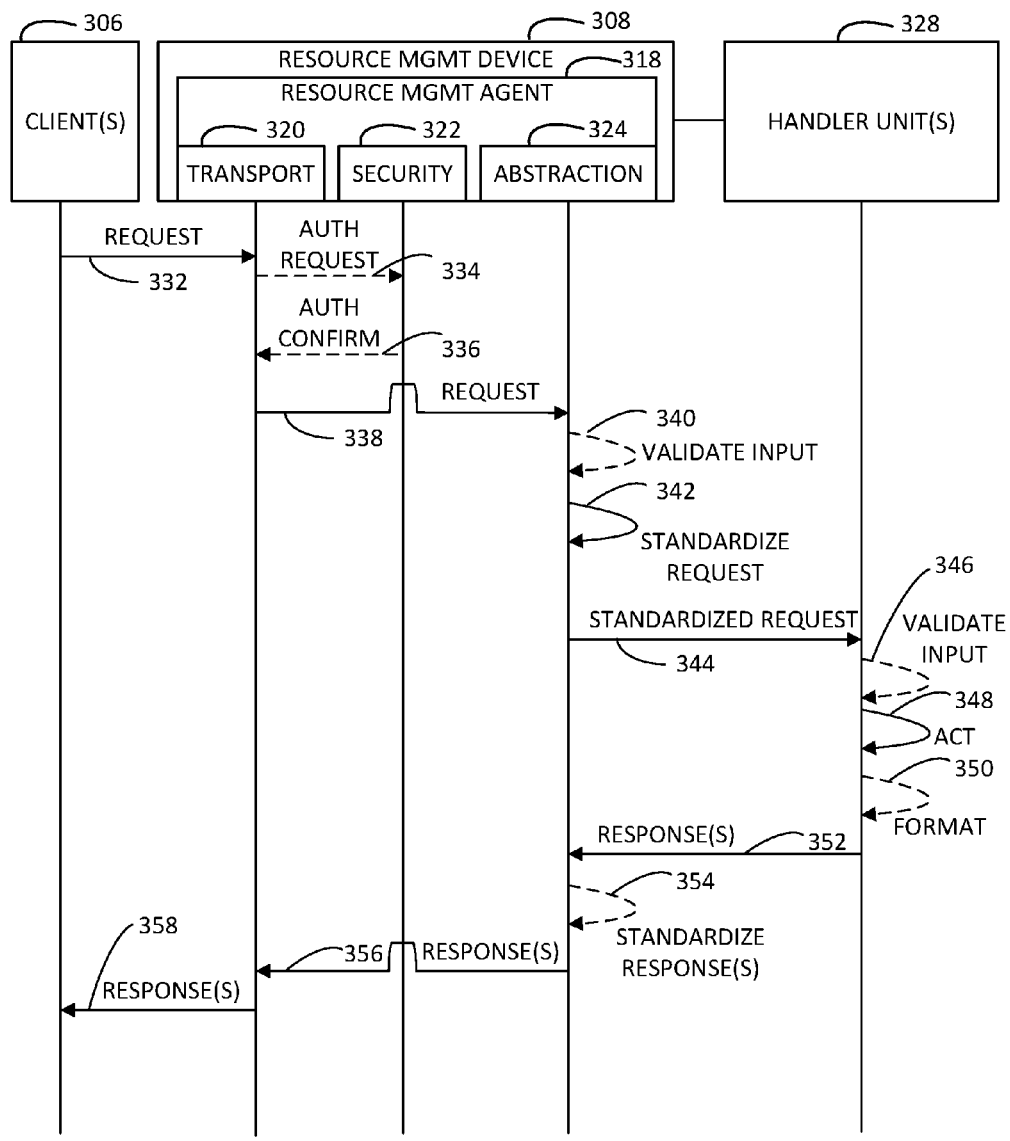
FIGS. 3 and 4 are sequence diagrams showing examples of client request(s) involving resource device(s) via a resource management device, according to embodiments of this disclosure.
Figure 4:
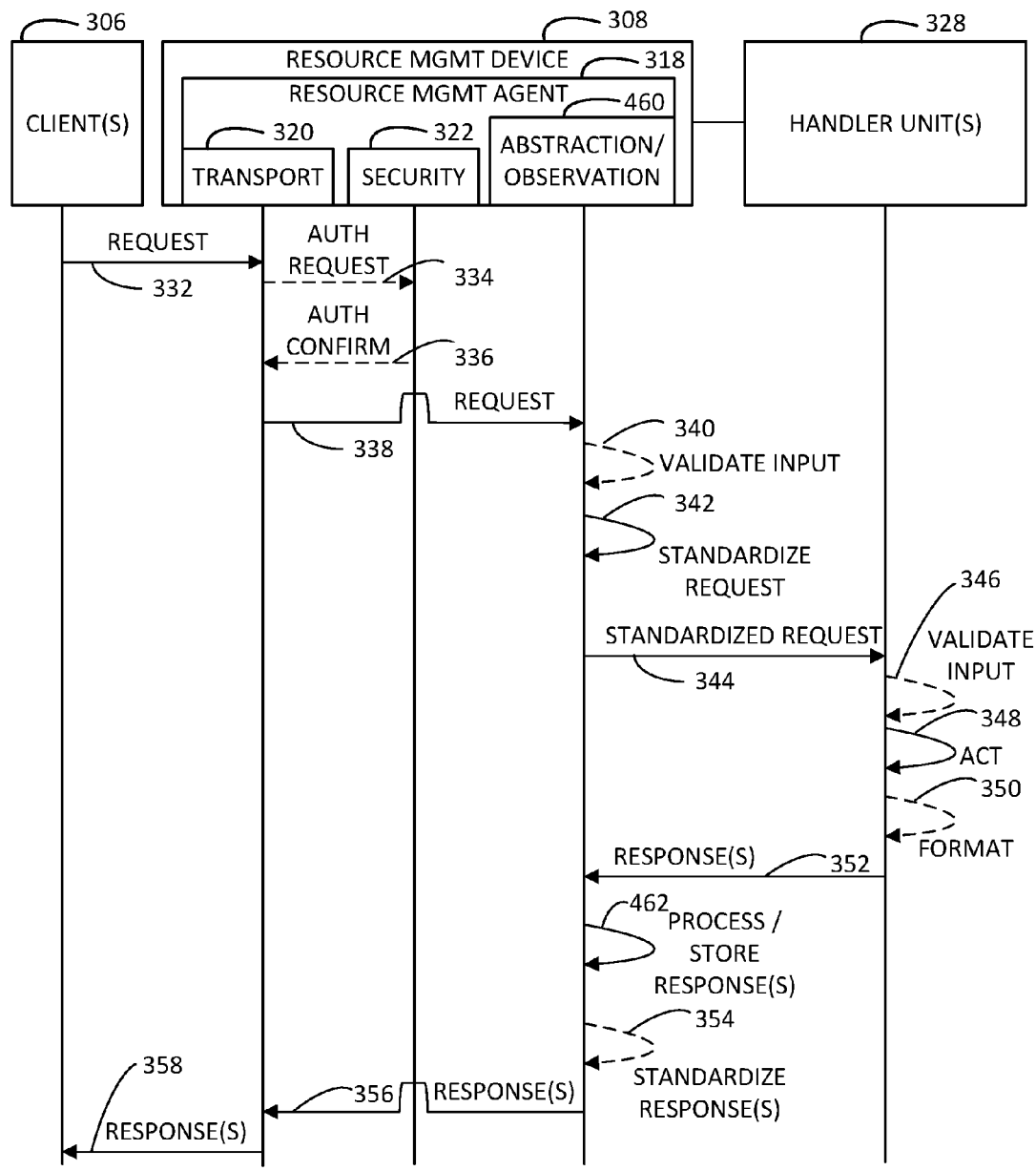

FIGS. 3 and 4 are sequence diagrams showing examples of client requests involving (e.g., for data from, for a configuration change of, or for an action by) a resource device via a resource management device, according to embodiments of this disclosure. Referring to FIG. 3, a client device 306 (e.g., a client device 106 of FIG. 1) may send a request (332) to resource management device 308 (e.g., endpoint device 108A of FIGS. 1 and 2). At resource manage device 308, a transport module 320 of a resource management agent 318 receives the communicated request and sends an authentication request (334) to transport security module 322 of resource management agent 318 for authentication of the sending device. If authentication is successful, an authentication confirmation message (336) may be sent to transport module 320. Alternatively, if authentication is not successful, an error message may be returned to transport module 320 (which may in turn by sent to client 306), with no further request processing. Upon successful authentication of the sending device, the request is provided (338) from transport module 320 to abstraction module 324 of resource management agent 318. In an embodiment, abstraction module 324 may optionally validate the input parameters (340) provided in the request. If one or more input parameters are invalid or otherwise incorrect, an error message may be provided to transport module 320 (which may, in turn, be sent on to the requesting client device(s) (not shown)). Otherwise (or if validation of input is not employed), the request is standardized (342) by abstraction module 324, and the standardized request is provided (344) to one or more handler units 328 (e.g., handler unit 228A and/or 228B). If input validation was not performed by abstraction module 324, it may optionally be performed (346) by handler unit 328. If one or more input parameters are invalid or otherwise incorrect, an error message may be provided to resource management agent 318 (which may, in turn, be sent on to the requesting client device(s) (not shown)). Otherwise (or if validation of input is not employed), the handler unit 328 acts on the request (348) with the associated resource device (e.g., resource device 230A or 230B). In an embodiment handler unit 328 may optionally send an acknowledgement response to the resource management agent acknowledging receipt of the request. Handler unit 328 may optionally format any data (350) retrieved from its associated resource device as previously instructed (e.g., via configuration file), or as instructed in the data request. Handler unit 328 may then send one or more responses (352) to abstraction module 324. The response may include requested data, for example, or may include an error message if the request could not be retrieved (e.g., if input parameters were incorrect or invalid, if the resource device was down or malfunctioning, if requested data could not be formatted as required or requested, etc.). Abstraction module 324 may optionally standardize the received response (354) prior to providing the received response (356) to transport module 320, which in turn may provide the response (358) to the requesting client device(s) 306.

FIG. 4 illustrates a similar sequence diagram as shown in FIG. 3, except that, for observation of one or more resource devices, the resource management agent may include an observation module 460, or incorporate observation features into the abstraction module. When a response (e.g., requested data) is received (at 352) from a handler unit 328 that retrieved information from an associated resource device, the abstraction/observation module 460 may process and/or store the response (462) (e.g., in memory 116 (of FIG. 1 or 2) or other memory location) as an observed response for later comparison with subsequently received responses as part of the observation feature. In an embodiment involving observation, the standardized request provided to handler unit 328 (at 344) may instruct handler unit 328 to regularly poll an associated resource device for data. In an alternative embodiment involving observation, abstraction/observation module 460 may repeatedly send requests to handler unit 328 to retrieve the requested data. For resources being observed, the response(s) provided at 356 and/or 358 may include, for example, every data value retrieved, only data value changes, data values in accordance with a specified observation condition (e.g., meets or exceeds a predetermined threshold that may be, for example, specified in the request or via configuration), data values retrieved at a specified polling interval, etc.

Figure 5:
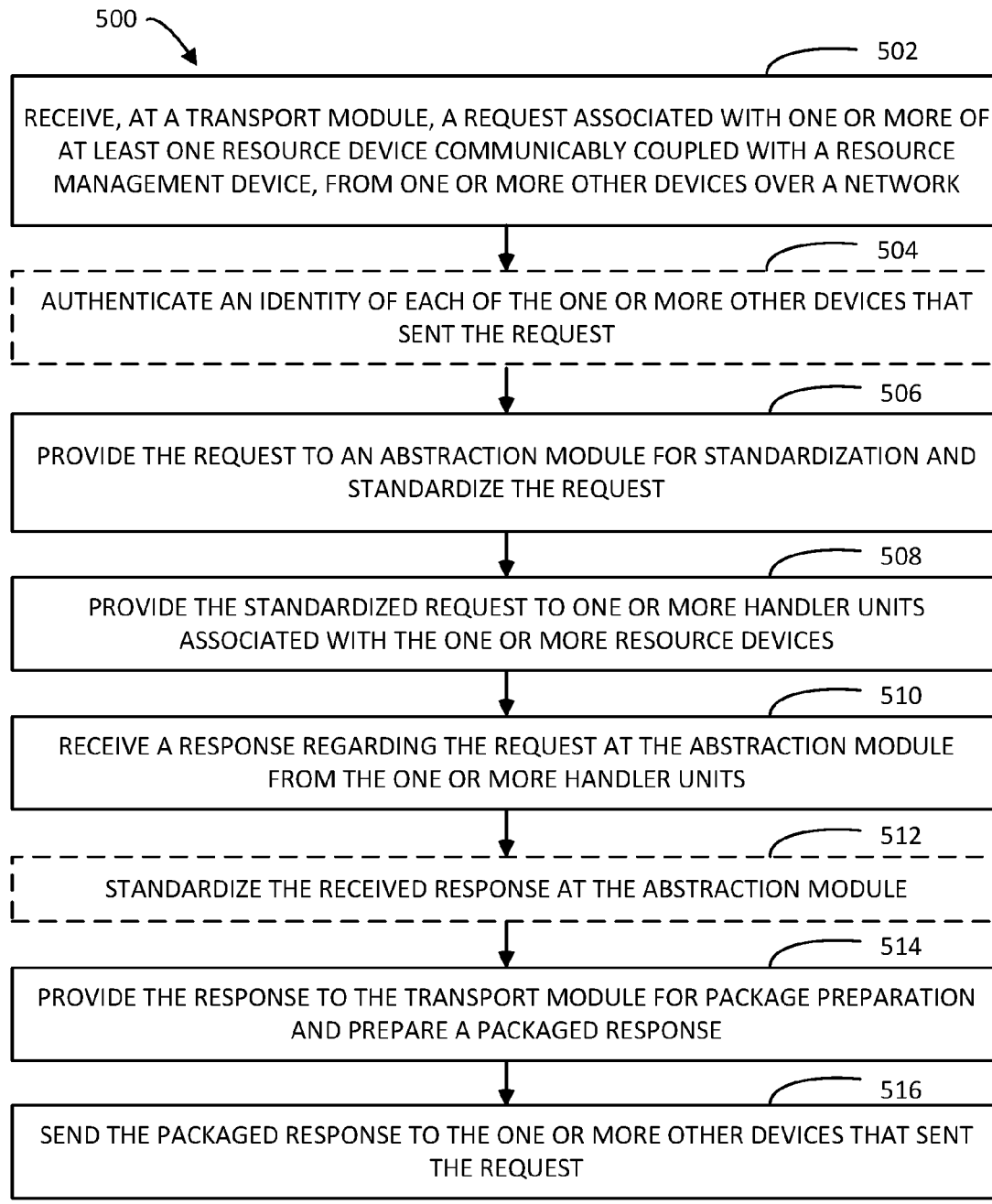
FIG. 5 is a flow diagram illustrating an example process flow of a client request and response from the perspective of a resource management device, according to embodiments of this disclosure.

FIG. 5 is a flow diagram illustrating an example process flow 500 of a client request and response from the perspective of a resource management device (e.g., an endpoint device 108/308), according to embodiments of this disclosure. At 502, a request associated with one or more of at least one resource device (e.g., resource devices 230A and/or 230B) managed by the resource management device may be received at a transport module (e.g., transport module 220/320) of agent software (e.g., agent software 218/318) of the resource management device from one or more other devices (e.g., client devices 106/306) over a network (e.g., network(s) 104). The request may include a request for one or more of: a data reading from one or more of the resource devices, a configuration change for one or more of the resource devices, or an action by one or more of the resource devices. An identity of each of the one or more requesting devices may optionally be authenticated at 504. Authentication may be performed by a transport security module (e.g., transport security module 222/322) of the agent software, and may optionally include authentication using the hardware cryptographic authentication described herein. At 506, the request may be provided to an abstraction module (e.g., abstraction module 224/324/460) of the agent software for standardization. The request may be standardized using standardization definitions that are universal across different types of resource devices and their associated devices, for example. At 508, the standardized request may be provided to one or more handler units (e.g., handler units 228/328) associated with the one or more resource devices. At 510, a response may be received at the abstraction module from the one or more handler units. The response may be, for example, requested data reading(s) of the resource devices, a confirmation message (e.g., of a configuration change or successful action), or an error message (e.g., configuration change failure, unsuccessful action, unexpected or incorrect input parameters, etc.). At 512, the received response may optionally be standardized by the abstraction module. At 514, the response may be provided to the transport module to prepare the response for sending to the requesting devices at 516.

FIGS. 6-10 illustrate various examples of request events from the perspectives of various elements of a resource management device and associated resource devices, according to embodiments of the present disclosure.

Figure 6:
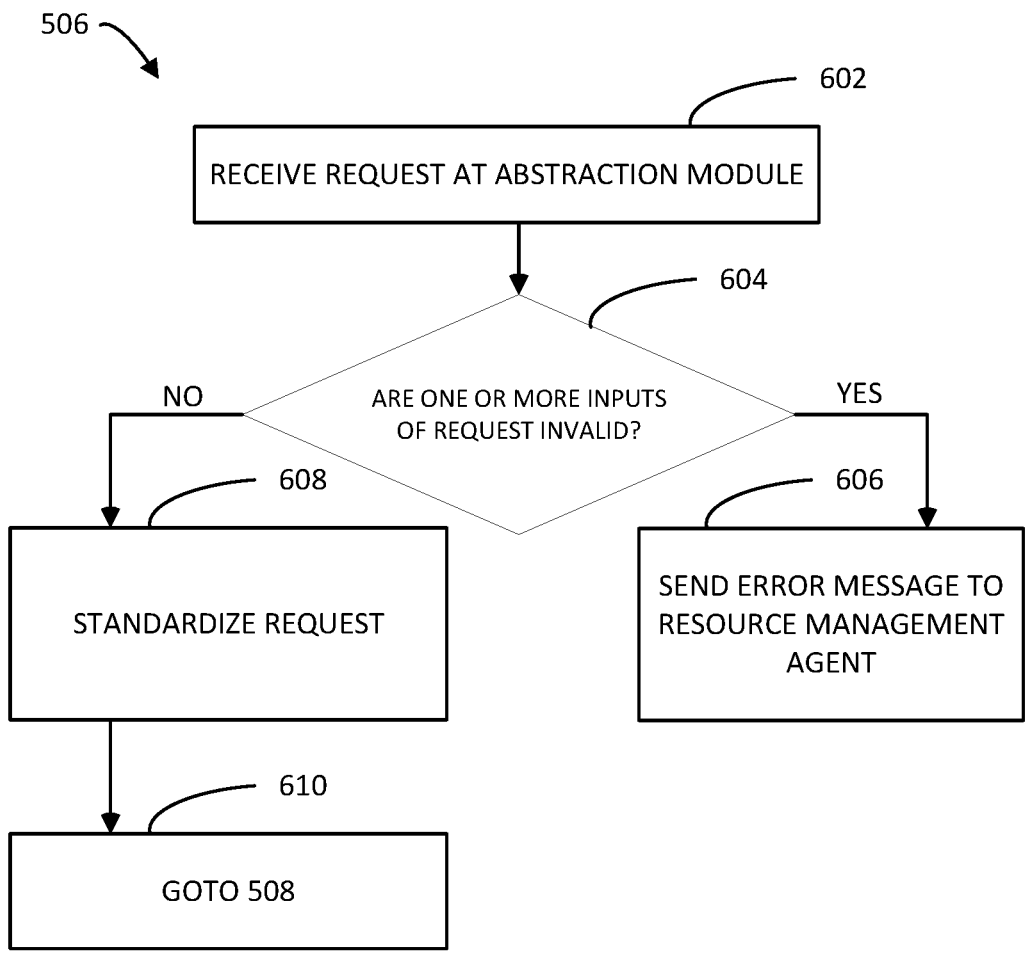
FIG. 6 is a flow diagram illustrating an example of an error check of a request at an abstraction module of a resource management device, according to an embodiment of this disclosure.

FIG. 6 is a flow diagram illustrating an example of block 506 of FIG. 5, according to an embodiment. In this example, an error check of a request is performed at the abstraction module prior to standardization of the request. At 602, the request may be received at the abstraction module. At 604, the abstraction module may determine whether the inputs or parameters of the request are invalid (e.g., unexpected, incorrect, etc.). If so, at 606 an error message may be prepared/sent to the resource management agent (which in turn may be sent to requesting client device(s)). If not, at 608, the request is standardized, and at 610, the process 500 continues at block 508 (FIG. 5).

Figure 7:
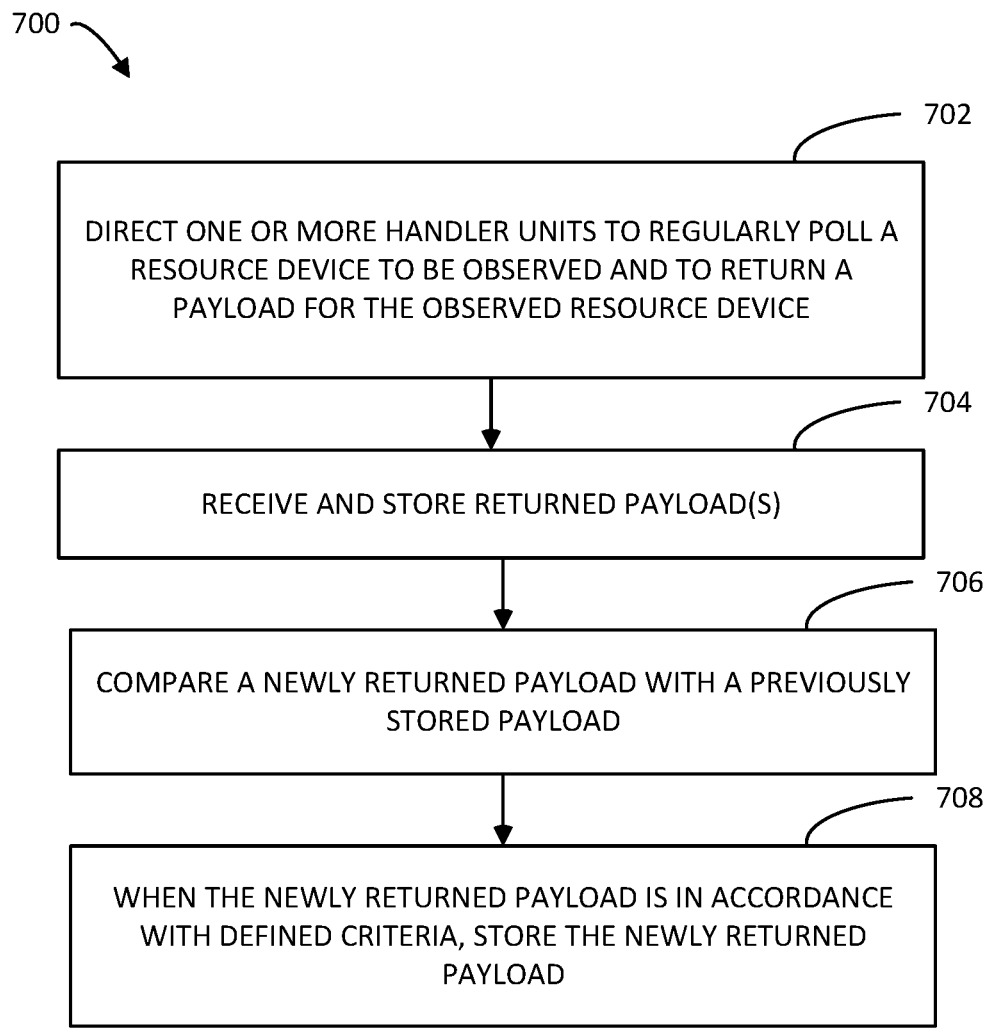
FIG. 7 is a flow diagram illustrating an example method of polling a resource device, according to an embodiment of this disclosure.

FIG. 7 is a flow diagram illustrating an example method 700 of polling a resource device, according to an embodiment of this disclosure. Method 700 is from the perspective of a resource management device that, for example, may have received a request from a client device to observe one or more resource devices. In an alternative embodiment, the request for observation may originate at the resource management agent (e.g., in order to process a client request or otherwise learn information regarding the resource device). At 702, one or more handler units may be directed to regularly poll a resource device or devices to be observed and to return payload information for the observed resource device(s). A polling frequency, or minimum polling interval, may have been included in the initial client request, may have been specified by the agent software of the resource management device, or may have been previously set for the handler unit(s) (e.g., in a configuration file). In an embodiment, the resource management agent may repeatedly send requests to the one or more handler units to retrieve payloads. At 704, payload(s) returned by the handler unit(s) may be received and stored. At 706, a newly returned payload may be compared with a previously stored payload. At 708, the newly returned payload may be stored if in accordance with defined criteria. For example, every newly returned payload may be stored, or storing may occur only if the newly returned payload differs from a previous payload, or storing may occur based on other criteria. Returned payload data may be sent to observing clients. In embodiments, every received payload may be sent to observing clients, a change in payload may be sent to observing clients, a payload in accordance with a specified observation condition (e.g., meets or exceeds a predetermined threshold that may be, for example, specified in the request or via configuration) may be sent to observing clients, etc.

Figure 8:
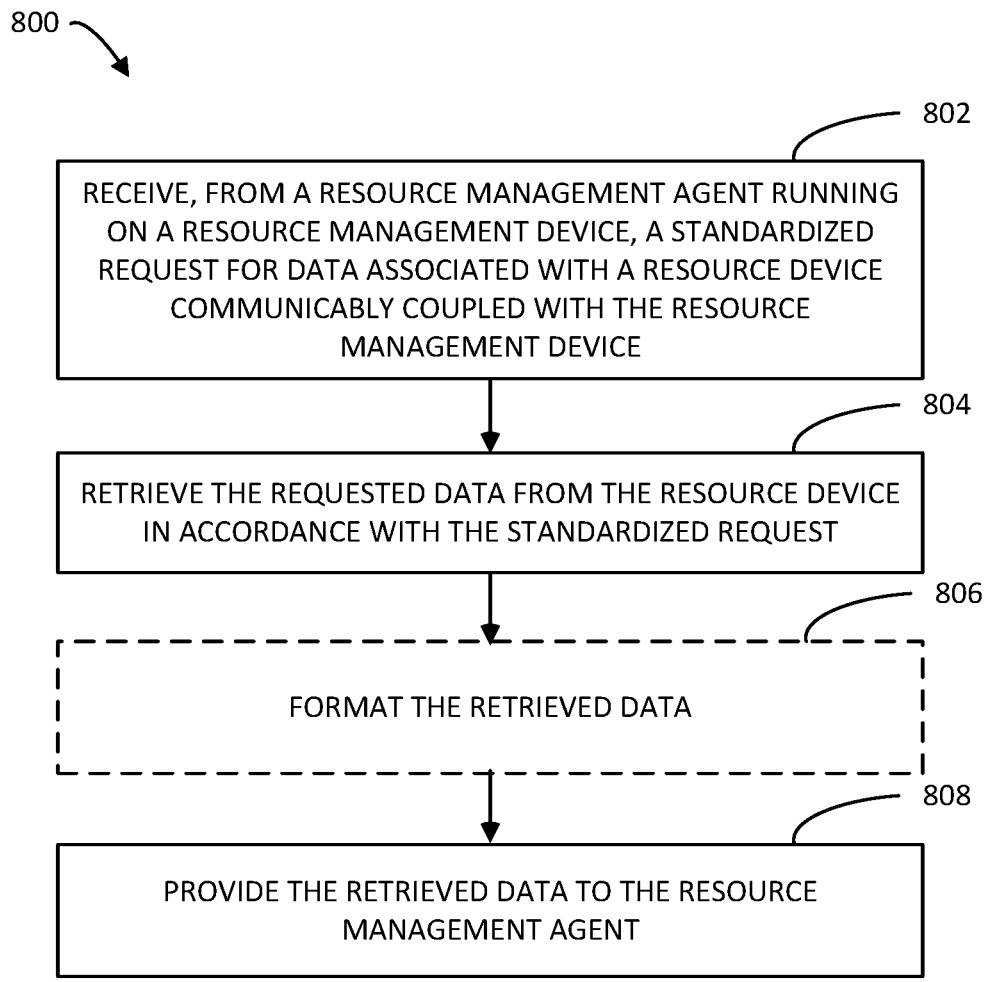
FIG. 8 is a flow diagram illustrating an example method of retrieving data from a resource device from the perspective of a handler unit, according to embodiments of this disclosure.

FIG. 8 is a flow diagram illustrating an example method 800 of retrieving data from a resource device from the perspective of a handler unit, according to embodiments of this disclosure. At 802, a standardized request may be received, from a resource management agent (e.g., agent software of a resource management device), requesting a data read from a resource device that is managed by the resource management device. At 804, the requested data may be retrieved from the resource device in accordance with the standardized request. At 806, the retrieved data may optionally be formatted in accordance with the standardized request or as the handler unit may itself be configured to format data (e.g., in accordance with a configuration file). At 808, the retrieved data may be provided to the resource management agent.

Figure 9:
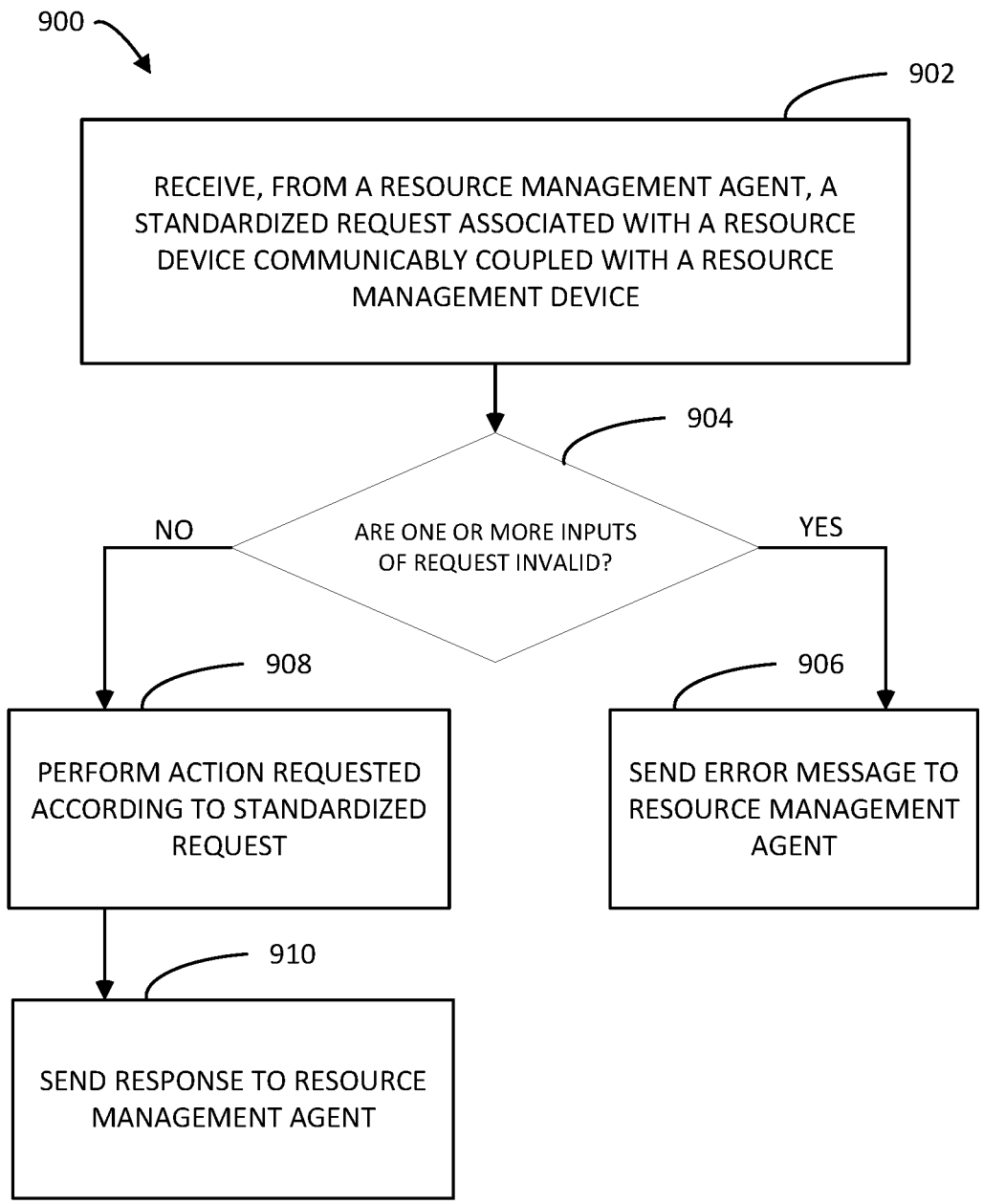
FIG. 9 is a flow diagram illustrating an example method of receiving and acting on a request associated with a resource device from the perspective of a handler unit, according to an embodiment of this disclosure.

FIG. 9 is a flow diagram illustrating an example method 900 of receiving and acting on a request associated with a resource device from the perspective of a handler unit, according to an embodiment. At 902, a standardized request associated with a resource device may be received by the handler unit from a resource management agent. At 904, the handler unit may determine if one or more inputs or parameters of the request are invalid (e.g., unexpected, incorrect, etc.). If so, at 906 an error message may be prepared/sent to the resource management agent. If not, at 908, the handler unit may perform the action requested (e.g., retrieve data from the resource device, configure the resource device, activate the resource device, etc.) in accordance with the standardized request. At 910, a response may be sent to the resource management agent. The response may include, for example, the requested data (possibly formatted by the handler unit), a confirmation that a requested configuration or activation was executed successfully, or an error message that the request was not able to be performed.

Figure 10:
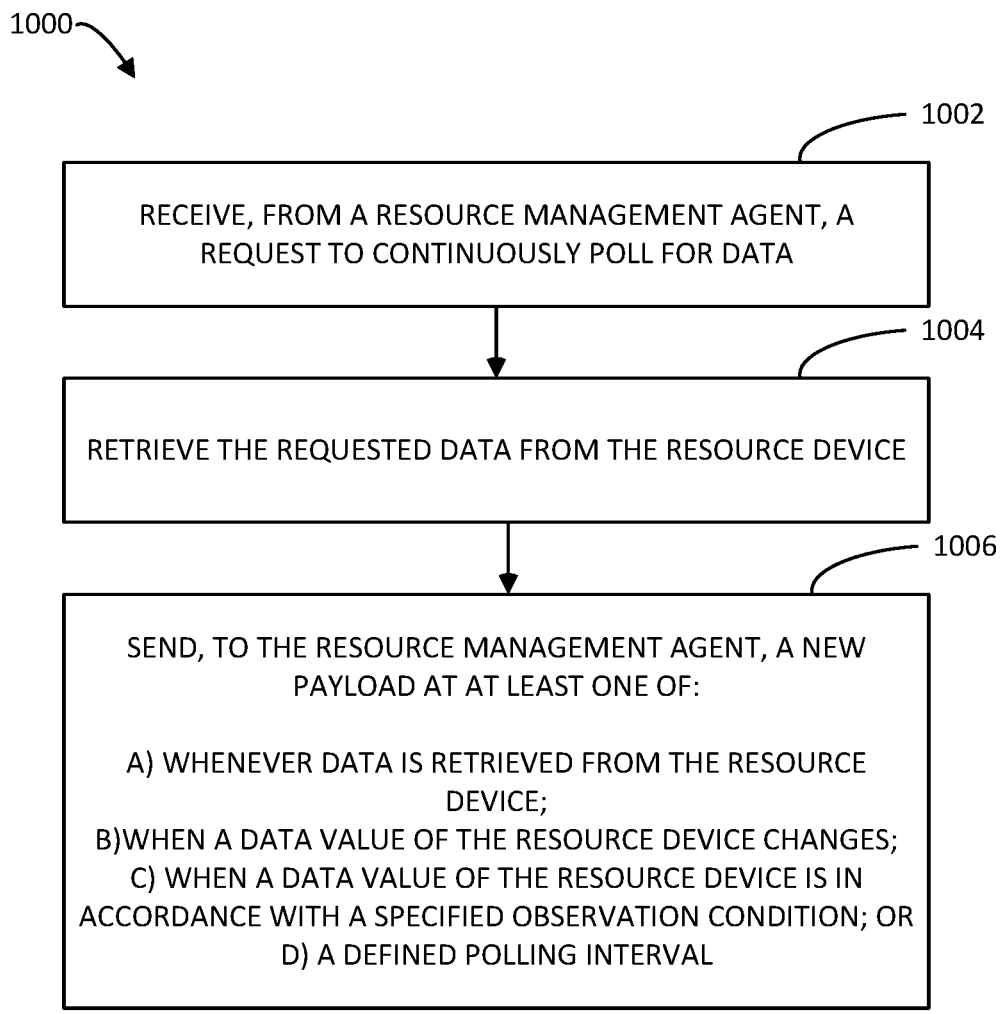
FIG. 10 is a flow diagram illustrating an example method of polling a resource device from the perspective of a handler unit, according to an embodiment of this disclosure.

FIG. 10 is a flow diagram illustrating an example method 1000 of polling a resource device from the perspective of a handler unit, according to an embodiment. At 1002, a request to continuously poll for data from an associated resource device may be received by a handler unit from a resource management agent. At 1004, the requested data may be continuously retrieved from the resource device (e.g., at a regular interval specified in the request, or known by the handler unit (e.g., in a configuration file or setting of the handler unit)), and an initial retrieved payload may be provided to the resource management agent. At 1006, the handler unit may send to the resource management agent new payload. In embodiments, the handler unit may send a new payload in any of the following example situations: every time a data value is retrieved from the resource device, every time a data value changes from the previous value, when a retrieved data value is in accordance with a specified observation condition (e.g., meets or exceeds a predetermined threshold that may be, for example, specified in the request or via configuration), etc.

Hardware Cryptographic Authentication

As discussed above, an important aspect of an IoT platform is security. While a transport security layer, such as transport security module 222 of FIG. 2, may normally use certificates to verify whether a communicating device can trust another communicating device, the use of certificates may not be the best security solution for an IoT platform. The large number of devices potentially communicating in an IoT environment, and any constraints of the network, may make it difficult to manage such a large number of certificates. Referring back to FIG. 2, authentication unit 227 may work in conjunction with transport security module 222 to provide a more manageable solution in the form of hardware cryptographic authentication, according to embodiments described herein. To implement this solution, authentication unit 227 may comprise an authentication chip that stores a write-once, never-read shared authentication key, a unique serial number, and various authentication code functions (e.g., Message Authentication Code (MAC) functions and/or hash-based MAC functions (HMAC)). The unique serial number is unique to the authentication chip, and is used to provide a unique identification of the device when connected to the authentication chip. The unique serial number may be readable from the chip, but not changeable on the chip. For these reasons, the unique serial number may be referred to herein as the serial number of the device to which it is connected. If the authentication chip is moved from one device to another, the unique serial number will no longer be associated with the device it was moved from, and will then be associated with the device it was moved to. The authentication codes may be generated by the chip itself, and may include, or be based upon, the serial number and the authentication key. In addition, the chip may optionally generate one or more challenges to further strengthen security with a device with which the device associated with the chip is in communication. A challenge may be used to verify possession of the same or associated authentication key, for example. Ideally, a challenge may be a randomized string that is never to be reused, and cannot be guessed in advance. The authentication chip may be housed inside a device (e.g., a resource management device), or may be connected to a device using, for example, an external hardware dongle. Any devices that have the same key or an associated key (e.g., a key that belongs to a known group of admissible keys) burned in the authentication chip at manufacturing, for example, may be able to verify the identity of each other (e.g., by recognizing that the other device has an admissible key, by verifying a response to a provided challenge, etc.), and this is done in a manner that cannot be observed or copied by another entity. With this security mechanism in place, device identity may be safely confirmed without needing to maintain a classic certificate authority structure, and if using a hardware dongle, without embedding unique certificates or keys in the firmware of each device at device manufacturing time. Another advantage of using a hardware dongle is, if the key is somehow exposed or compromised, devices may be "rekeyed" by changing their dongles.

In an embodiment, the authentication chips may be "burned" with the key information by the manufacturers of the resource management devices that are to use the chips prior to shipping the resource management devices to customers for deployment. In an alternative embodiment, the chips may be shipped "blank" (i.e., with no key information) to the customers in case the customers want to use their own authentication keys and manage their own networks. This, however, may provide a segregated network, as devices with different key information will not be able to verify each other's identity. This may be advantageous in some cases, however, for customers who wish to host their own control centers.

Figure 11:
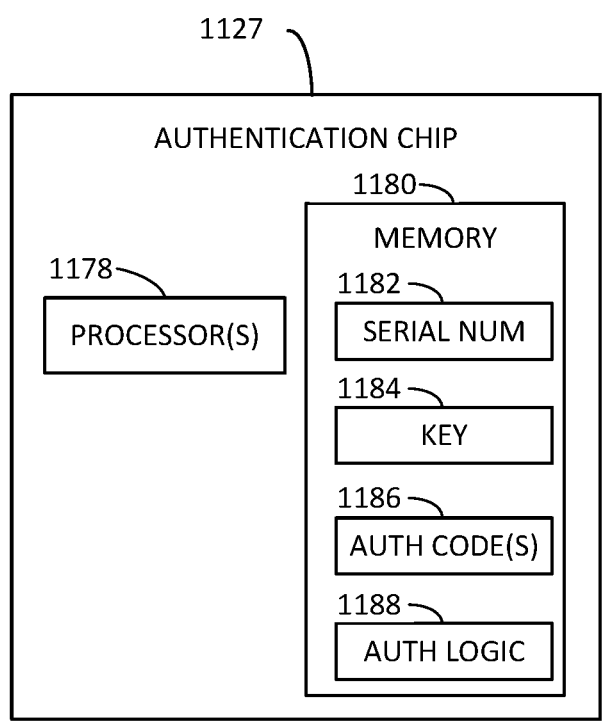
FIG. 11 is a block diagram of an example authentication chip, according to an embodiment of this disclosure.

FIG. 11 is a block diagram of an example authentication chip 1127, according to an embodiment. Authentication chip 1127 may be, or may be a part of, authentication unit 227 of FIG. 2, for example, which may be housed within a resource management device, or may be housed in a hardware dongle externally connected to a resource management device via a port or connection point of the resource management device, for example. Authentication chip 1127 may include one or more processor(s) 1178 and a memory 1180. Processor(s) 1178 may be implemented by, for example but not limitation, one or more integrated circuits, logic circuits, microprocessors, controllers, etc. Processor(s) 1178 may include a local memory (e.g., a cache) (not shown). Memory 1180 may be a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 1180 may be controlled by a memory controller (not shown). Memory 1180 may store, for example, a serial number 1182, authentication key 1184, and authentication codes 1186. Memory 1180 may also store authentication logic 1188. The data stored in memory 1180 may be used by processor(s) 1178 (e.g., by executing authentication logic 1188) to facilitate the authentication functions described herein.

As discussed earlier in this document, the hardware authentication solution may integrate with the transport security layer (e.g., with transport security module 222 of FIG. 2). For example, raw public/private keys may be generated on a device (and may be regenerated on demand) and may be used to initially establish a transport security session (e.g., a DTLS session). Once the session is secured, each device may verify the identity of each other via the hardware authentication solution described herein. If each device is verified by the other, then the communication session may be considered authenticated for the device serial numbers in use. As discussed above, in an embodiment, the communicating devices may also optionally exchange sub-device IDs in addition to serial numbers. Sub-device IDs may indicate different applications or users sharing the same physical device, but which may need to have separate access controls in place for security and/or permission reasons. When multiple users and/or applications need to have simultaneous access on a device, a new transport session may be used for each device serial number and sub-device ID combination.

Figure 12:
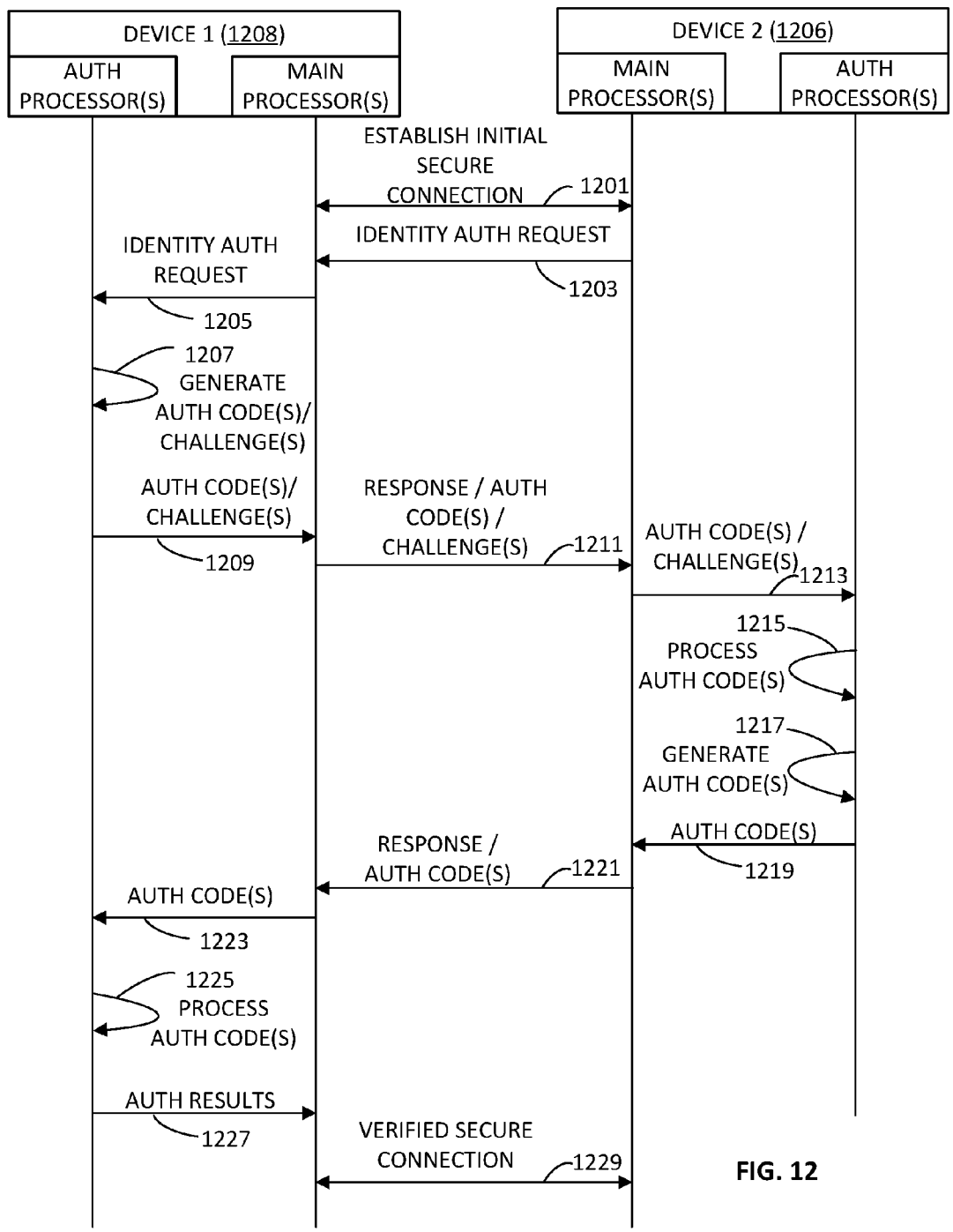
FIG. 12 is a sequence diagram showing an example authentication procedure, according to an embodiment of this disclosure.

FIG. 12 is a sequence diagram showing an example authentication process 1200, according to an embodiment. FIG. 12 illustrates authentication between two communicating devices. Device 1208 (Device 1) may be, for example, a resource management device (such as a resource management device 108) that manages a resource device (such as resource 230A or resource 230B of FIG. 2, for example). Device 1206 (Device 2) may be, for example, a client device (such as a client device 106) that may send a request to a resource management device to request data or request configuration or activation of an associated resource device. Devices 1206 and 1208 may each include one or more main processors as well as one or more authentication processors. The authentication processor(s) may be part of an authentication chip either internal to devices 1206 and 1208, or external to devices 1206 and 1208 (such as via a hardware dongle). In process 1200, an initial secure connection is established, at 1201, between devices 1206 and 1208 via their main processor(s). The initial secure connection may be initiated by the requesting device (e.g., device 1206) and may be, for example, a DTLS connection. At 1203, a main processor of device 1206 may send a request for identity authentication to device 1208. The identity authentication request may be encrypted.

At 1205, a main processor of device 1208 may pass the identity authentication request to an authentication processor of an authentication chip of device 1208. At 1207, the authentication processor may use authentication functions stored on the authentication chip to generate one or more authentication codes using a unique serial number and key, each stored on the authentication chip. In addition, or optionally, one or more challenge(s) may be generated to provide to device 1206 as a request for identity authentication of device 1206. At 1209, the generated authentication code(s) (and challenge(s)) may be provided to the main processor of device 1208, and at 1211, a response to the identity authentication request may be returned to device 1206 with the generated authentication code(s) (and challenge(s)).

At 1211, device 1206 may receive the response/authentication code(s)/challenge(s), and at 1213, a main processor of device 1206 may pass the authentication code(s)/challenge(s) to an authentication processor of an authentication chip of device 1206. At 1215, the authentication processor may process the authentication code(s) received from device 1208 (e.g., based on a key of the authentication chip of device 1206) to determine if the code(s) are in accordance with its key. If not, authentication of device 1208 fails, and an authentication failure message may be provided to a main processor of device 1206 and optionally to device 1208. If so, the authentication is considered successful, and at 1217, the authentication processor of device 1206 may generate its own authentication codes (e.g., based on its own key) in response to the challenge received from device 1208. The generated authentication codes may be provided to a main processor of device 1206 at 1219. At 1221, a response to the received challenge, including the generated authentication codes of device 1206, may be sent to device 1208.

The response with authentication code(s) from device 1206 may be received by a main processor of device 1208 and passed on to an authentication processor of device 1208 at 1223. At 1225, the authentication processor of device 1208 may process the authentication code(s) received from device 1206 (e.g., based on the key of the authentication chip of device 1208) to determine if the code(s) are in accordance with its key. The authentication results may be provided to a main processor of device 1208 at 1227. If the authentication of device 1206 failed, an authentication failure message may be provided to device 1206. If authentication was successful, a secure connection may be considered verified between devices 1206 and 1208 (at 1229).

Figure 13:
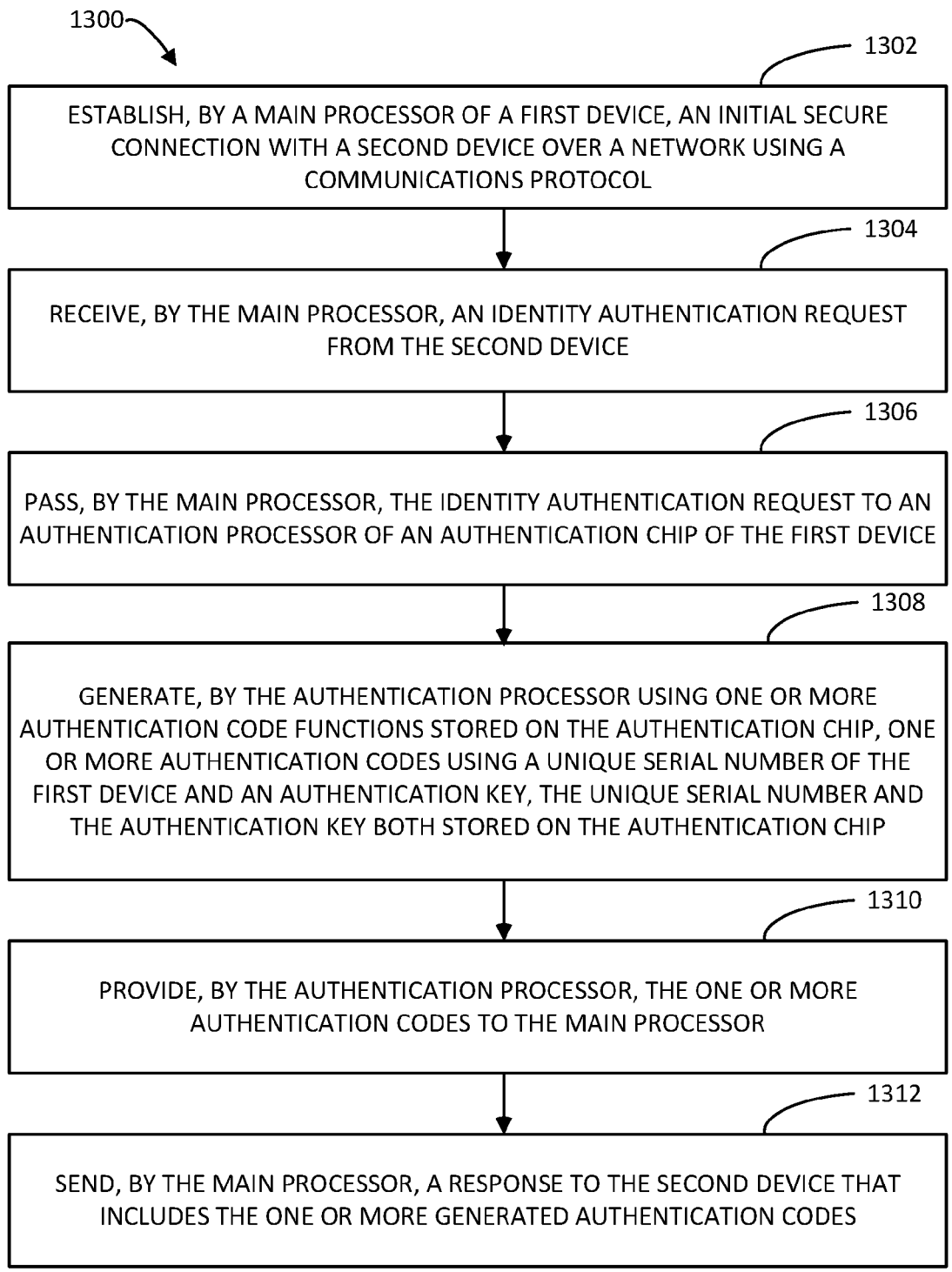
FIG. 13 is a flow diagram illustrating an example authentication process from the perspective of one of two communicating devices, according to an embodiment of this disclosure.

FIG. 13 is a flow diagram illustrating an example authentication process 1300 between two devices, according to an embodiment, and from the perspective of a first device. At 1302, an initial secure connection may be established between the first device and a second device over a network using a communications protocol. At 1304, an identity authentication request may be received at the first device, from the second device. At 1306, the identity authentication request may be passed to an authentication processor of an authentication chip of the first device. At 1308, one or more authentication codes may be generated by the authentication processor using one or more authentication code functions stored on the authentication chip. The one or more authentication codes may be generated using a unique serial number of the first device and an authentication key, both of which may be stored on the authentication chip. At 1310, the authentication processor may provide the one or more authentication codes to the main processor to be sent to the second device as a response.

Figure 14:
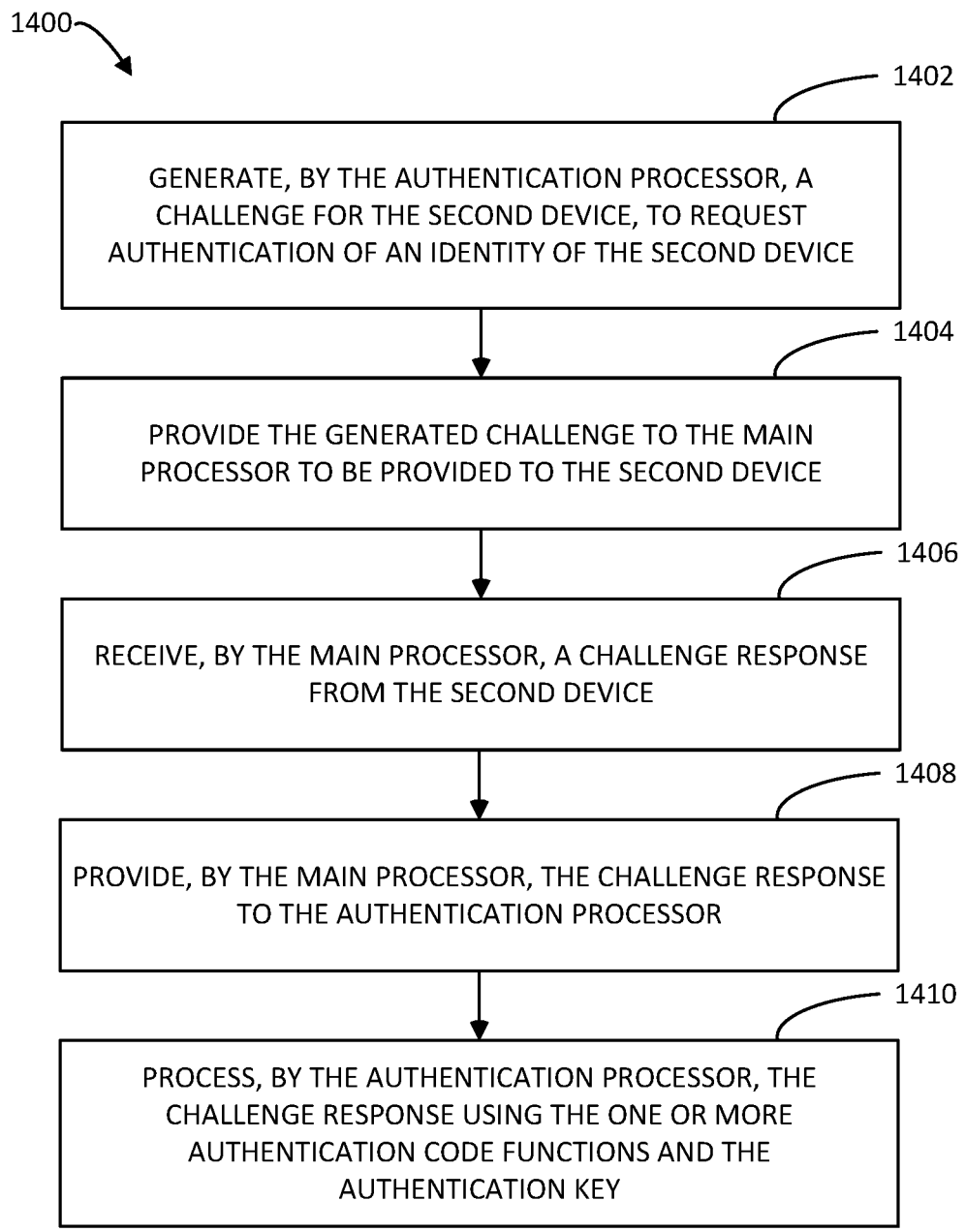
FIG. 14 is a flow diagram illustrating an example method of challenge generation and response processing, according to an embodiment of this disclosure.

Included in the authentication code(s), or in addition to the authentication code(s), the authentication processor may generate one or more challenge(s) to be sent to the second device to request authentication of the second device. For example, the one or more challenge(s) may be sent to the second device along with the response. FIG. 14 illustrates an example method 1400 of challenge generation and response processing, according to an embodiment of this disclosure, which can be considered an extension of authentication process 1300. At 1402, the authentication processor may generate one or more challenge(s) to request authentication of the identity of the second device. At 1404, the generated challenge(s) may be provided to a main processor to be provided to the second device. At 1406, the main processor may receive a challenge response from the second device, which may be provided to the authentication processor at 1408. At 1410, the authentication processor may process the challenge response using one or more authentication code functions and the authentication key. The challenge response may include one or more authentication code(s) generated by the second device, and the processing of the challenge response may include processing the one or more authentication code(s) of the second device. For successful authentication, the authentication code(s) provided by the second device are to be in accordance with the authentication key of the authentication chip of the first device. In an embodiment, for successful authentication, the authentication key used by the second device is to identically match the authentication key stored on the authentication chip of the first device. In another embodiment, the authentication key provided by the second device is to be in a predetermined range of, or a member of, a group of admissible keys. The results of the authentication verification may be provided to the main processor to indicate successful or unsuccessful authentication.

Figure 15:
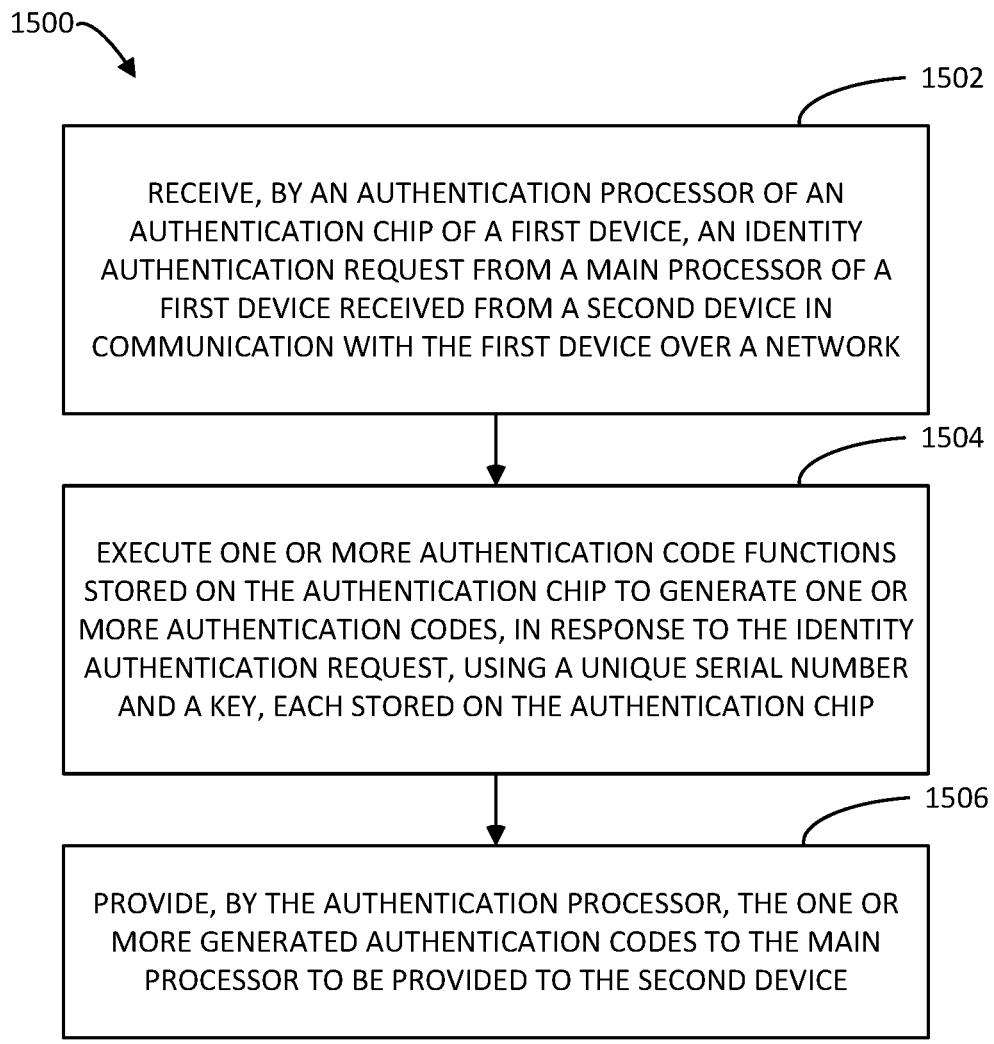
FIG. 15 is a flow diagram illustrating an example method of authentication from the perspective of an authentication chip, according to an embodiment of this disclosure.

FIG. 15 is a flow diagram illustrating an example method 1500 of authentication from the perspective of an authentication chip, according to an embodiment. At 1502, an authentication processor of an authentication chip of a first device may receive an identity authentication request from a main processor of the first device that was received from a second device in communication with the first device over a network. At 1504, one or more authentication code functions (stored on the authentication chip) may be executed to generate one or more authentication codes in response to the identity authentication request. The generated authentication code(s) may be based on a unique serial number and authentication key of the first device. At 1506, the one or more generated authentication code(s) may be provided to the main processor to be provided to the second device.

Figure 16:
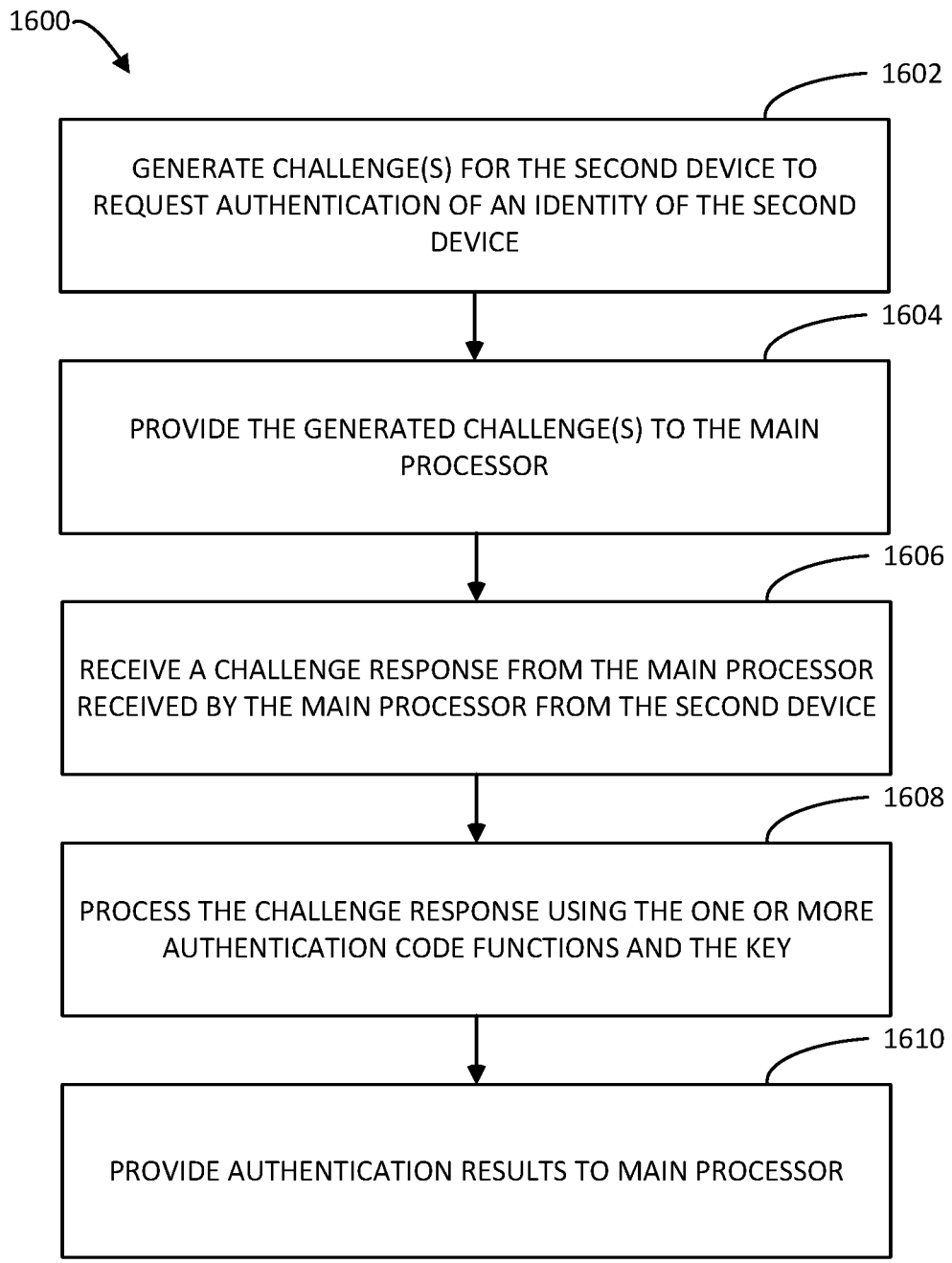
FIG. 16 is a flow diagram illustrating an example method of challenge generation and response processing from the perspective of an authentication chip, according to an embodiment of this disclosure.

Included in the authentication code(s), or in addition to the authentication code(s), the authentication processor may generate one or more challenge(s) to be sent to the second device to request authentication of the second device. FIG. 16 illustrates an example method 1600 of challenge generation and response processing, according to an embodiment of this disclosure, which can be considered an extension of authentication method 1500. At 1602, the authentication processor may generate one or more challenge(s) to request authentication of the identity of the second device. At 1604, the generated challenge(s) may be provided to a main processor to be provided to the second device. At 1606, a challenge response may be received from the main processor that was received from the second device. At 1608, the authentication processor may process the challenge response using one or more authentication code functions and the authentication key. The challenge response may include one or more authentication code(s) generated by the second device, and the processing of the challenge response may include processing the one or more authentication code(s) of the second device. For successful authentication, the authentication code(s) provided by the second device are to be in accordance with the authentication key of the authentication chip of the first device. In an embodiment, for successful authentication, the authentication key used by the second device is to identically match the authentication key stored on the authentication chip of the first device. In another embodiment, the authentication key provided by the second device is to be in a predetermined range of, or a member of, a group of admissible keys. The results of the authentication verification may be provided to the main processor (at 1610) to indicate successful or unsuccessful authentication.

One or more features disclosed herein may be implemented in hardware, software, firmware, and/or combinations thereof, including discrete and integrated circuit logic, application specific integrated circuit (ASIC) logic, and microcontrollers, and may be implemented as part of a domain-specific integrated circuit package, or a combination of integrated circuit packages. The terms software and firmware, as used herein, refer to a computer program product including at least one computer readable medium having computer program logic, such as computer-executable instructions, stored therein to cause a computer system to perform one or more features and/or combinations of features disclosed herein. The computer readable medium may be transitory or non-transitory. An example of a transitory computer readable medium may be a digital signal transmitted over a radio frequency or over an electrical conductor, through a local or wide area network, or through a network such as the Internet. An example of a non-transitory computer readable medium may be a compact disk, a flash memory, SRAM, DRAM, a hard drive, a solid state drive, or other data storage device.

A processing platform of a client device (e.g., client device(s) 106, computing devices located at central office 102, mobile collection devices (not shown)) or an endpoint device (e.g., endpoint device(s) 108, of FIG. 1) may be embodied in any type of mobile or non-mobile computing device. Examples of mobile devices may include, but are not to be limited to, laptop computers, ultra-laptop computers, tablets, touch pads, portable computers, handheld computers, palmtop computers, personal digital assistants (PDAs), e-readers, cellular telephones, combination cellular telephone/PDAs, mobile smart devices (e.g., smart phones, smart tablets, etc.), mobile internet devices (MIDs), mobile messaging devices, mobile data communication devices, mobile media playing devices, cameras, mobile gaming consoles, wearable devices, mobile industrial field devices, etc. Examples of non-mobile devices may include, but are not to be limited to, servers, personal computers (PCs), Internet appliances, televisions, smart televisions, data communication devices, media playing devices, gaming consoles, industrial field devices, etc.

Figure 17:
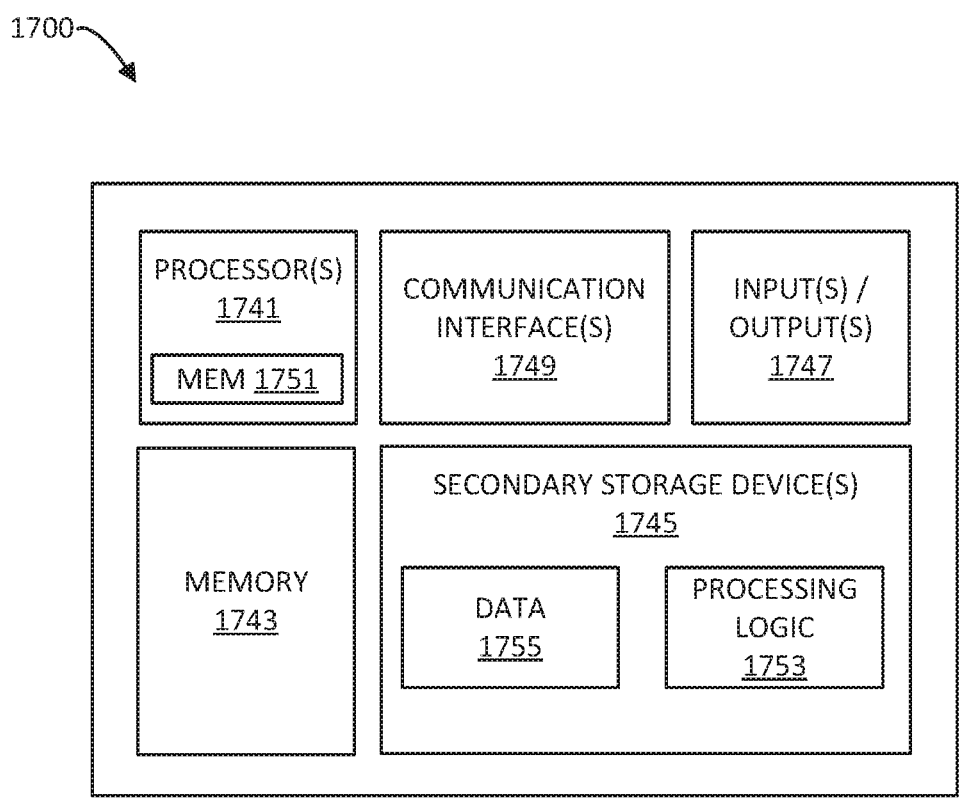
FIG. 17 is a block diagram of an example client or resource management device (i.e., endpoint device), according to an embodiment of this disclosure.

FIG. 17 is a block diagram of an example mobile or non-mobile client device or endpoint device, according to embodiments. Processing platform 1700 may include one or more processors 1741, memory 1743, one or more secondary storage devices 1745, one or more input/output devices 1747, and/or one or more communication interfaces 1749, in communication via a bus, line, or similar implementation (not shown). Processor(s) 1741 may be implemented by, for example but not limitation, one or more integrated circuits, logic circuits, microprocessors, controllers, etc. Processor(s) 1741 may include a local memory 1751 (e.g., a cache). Memory 1743 may include a volatile and/or a non-volatile memory. Volatile memory may be implemented by, for example but not limitation, Synchronous Dynamic Random Access Memory (SDRAM), Dynamic Random Access Memory (DRAM), RAMBUS Dynamic Random Access Memory (RDRAM) and/or any other type of random access memory device. Non-volatile memory may be implemented by flash memory and/or any other desired type of memory device. Access to memory 1743 may be controlled by a memory controller (not shown). Data stored in local memory 1751 and/or memory 1743 may be used by processor(s) 1741 to facilitate the controlling of a resource device, according to embodiments of this disclosure.

Input/output devices 1747 may allow a user to interface with processor(s) 1741. Input devices may allow a user to enter data and/or commands for processor(s) 1741. Input devices may include, for example, an audio sensor, a microphone, a camera (e.g., still, video, etc.), a keyboard, a button, a mouse, a touchscreen, a track-pad, a trackball, isopoint, a voice recognition system, etc. Output devices may provide or present information to a user. Output devices may include, for example, display devices (e.g., a light emitting diode (LED), an organic light emitting diode (OLED), a liquid crystal display, a cathode ray tube display (CRT), a touchscreen, a tactile output device, a printer, speakers, etc.). The input/output devices 1747 may be connected to processor(s) 1741, for example, with an interface circuit (not shown). The interface circuit may be implemented by any type of interface standard, such as, for example, an Ethernet interface, a universal serial bus (USB), a PCI express interface, etc. For use with an output device, the interface circuit may include a graphics driver card, chip, and/or processor.

Communication interface(s) 1749 may be implemented in hardware or a combination of hardware and software, and may provide wired or wireless network interface(s) to one or more networks, such as network(s) 104 of FIG. 1. Communication interface(s) 1749 may be a part of, or connected with, the interface circuit discussed above, and/or may include or connect with communication devices such as a transmitter, a receiver, a transceiver, a modem and/or network interface card to facilitate exchange of data with external devices (e.g., computing devices of any kind) via a network, such as network(s) 104.

Secondary storage device(s) 1745 may store processing logic 1753 (e.g., software) to be executed by processor(s) 1741 and/or data 1755. Processing logic 1753 and data 1755 may be used by processor(s) 1751 to facilitate communications between devices and/or managing a resource device, according to embodiments of this disclosure. Processing logic 1753 may include instructions for executing the methodology described herein, for example. Examples of secondary storage device(s) 1745 may include one or more hard drive disks, compact disk (CD) drives, digital versatile disk (DVD) drives, Blu-ray disk drives, redundant array of independent disks (RAID) systems, floppy disk drives, flash drives, etc. Data and/or processing logic may be stored on a removable tangible computer readable storage medium (e.g., a floppy disk, a CD, a DVD, a Blu-ray disk, etc.) using one or more of the secondary storage device(s) 1745.

The technology disclosed herein provides a secure universal way to manage resource devices (sensors, actuators, etc.) in an IoT communications environment. A secure device authentication method allows two devices to authenticate each other's identity in a private manner undetectable and uncopiable by others. Communicating devices may generate their own public/private key pairs (regenerating as needed for security reasons, etc.). A new request may start with a transport security (e.g., DTLS) handshake, using these keys. Once the handshake is complete, another authentication method may be used to verify each other's identity (e.g., serial number and optional sub-device ID) via a hardware cryptographic chip with authentication code functionality (e.g., using challenges/responses). Once this second authentication is complete, the data transport session is associated with those specific devices (and optionally sub-devices), and may be trusted for the lifetime of the session, for example. If a device has multiple applications or users which may require different access levels, then a sub-device ID (e.g., unique to the user/application) may be provided during authentication, and separate data transport sessions may be initiated/maintained for each device/sub-device combination.

An IoT abstraction layer allows resource devices operating on a variety of different interfaces (e.g., I2C, GPIO, A2D, etc.) to be accessible as URI resources that can be accessed from various transport protocols (e.g., CoAP, HTTP, etc.) This abstraction layer allows, via configuration, the ability for resource devices to be mapped to URI resources in a flexible and extensible manner, with no need for re-compilation or constant software updates. At its most basic, a configuration may be used for each module that desires to add functionality. These modules may support as little as a single sensor, or may support highly complex systems. The module configuration may define what resources are being offered by a new module (e.g., resource types, content type, etc.) and what methods are available for each resource. It may define a program/command to run for given requests. Multiple (and differing) resources may share the same programs/commands.

The particular examples and scenarios used in this document are for ease of understanding and are not to be limiting. Though described for use with data collection and managing of sensors in a utility metering environment, features described herein may be used in many other contexts and situations that may or may not involve data collection or utility metering. For example, the features discussed herein may be beneficial in many other contexts in which sensors, actuators, etc., are used, and may even extend to general communications (e.g., telecommunications networks, mobile device networks, cellular networks, satellite networks, computer networks, broadcasting networks, etc.). Some examples of other contexts include pipeline systems and related safety (e.g., methane detection, leak detection, metering (flow rate, etc.), etc.), street lighting systems (e.g., on/off of lights or groups of lights, dimming, automatic controls (e.g., turning on/off when brightness (or dimness) reaches a threshold, turning on when a vehicle is present, etc.), air quality systems, solar power systems (metering, panel adjustment, problem detection, etc.), heating/ventilating/air conditioning (HVAC) control systems (automatic pre-cooling/heating, sub-metering, circuit level controls/sensing, etc.), etc. Many other industrial, field, business, municipal, home, and personal systems may also be contemplated that would benefit from what is described herein.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. A device capable of communications with one or more other devices via a communications network, the device comprising:
    a first processor;
    a communication system for two-way communications with the one or more other devices on the network, the communication system communicably connected with the first processor; and
    an authentication chip communicatively connectable with the first processor and the communication system, the authentication chip having:
        a second processor; and
        a memory communicably connected to the second processor for storing
            a unique serial number for the device,
            a key, wherein the key is to be written once and never read by the first processor, and
            one or more authentication code functions,
    wherein the first processor is configured to, after a secure data transport session is established between the device and an other device of the one or more devices that attempts to communicate with the device over the network, receive an authentication request from the other device and pass the authentication request to the second processor; and
    wherein the second processor is configured to, in response to the authentication request,
        execute one or more of the authentication code functions to generate one or more authentication codes using the unique serial number of the device and the key; and
        provide the one or more generated authentication codes to the first processor to be provided in a response to the other device over the network.

2. The device of claim 1, wherein the authentication request includes a challenge, and the one or more generated authentication codes include a challenge response.

3. The device of claim 1, wherein the second processor is further configured to:
    generate a challenge for the other device to request authentication of an identity of the other device;
    provide the generated challenge to the first processor;
    receive a challenge response from the first processor, the challenge response received by the first processor from the other device; and
    process the challenge response using the one or more authentication code functions and the key,
    wherein authentication is successful if the challenge response is correct and is determined to have used a key in accordance with the key of the authentication chip.

4. The device of claim 1, wherein the authentication chip is embodied in a hardware dongle.

5. The device of claim 1, wherein the key is initially blank and subsequently written to the authentication chip by a user.

6. The device of claim 1, wherein the one or more authentication codes further include sub-device identification to indicate different applications or different users that share the device.

7. The device of claim 6, wherein a different communication session is established with the other device for each application or user of the device having a different sub-device identification.

8. A method of establishing a secure and authenticated connection between two devices in communication via a network, the method comprising:
    establishing, by a first processor of a first device, a secure connection with a second device over the network using a communications protocol;
    receiving, by the first processor, an identity authentication request from the second device;
    passing, by the first processor, the identity authentication request to a second processor located on an authentication chip of the first device;
    generating, by the second processor using one or more authentication code functions stored on the authentication chip, one or more authentication codes using a unique serial number of the first device and an authentication key, the unique serial number and the authentication key both stored on the authentication chip;
    providing, by the second processor, the one or more generated authentication codes to the first processor; and sending, by the first processor, a response to the second device that includes the one or more generated authentication codes.

9. The method of claim 8, wherein the identity authentication request includes a challenge, and the one or more generated authentication codes include a challenge response.

10. The method of claim 8, further comprising:
generating, by the second processor, a challenge for the second device, to request authentication of an identity of the second device;
providing the generated challenge to the first processor;
receive, by the first processor, a challenge response from the second device;
provide, by the first processor, the challenge response to the second processor; and
process, by the second processor, the challenge response using the one or more authentication code functions and the authentication key,
wherein authentication of the identity of the second device is successful if the challenge response is correct and is determined to have used a key in accordance with the authentication key of the authentication chip.

11. The method of claim 8, wherein the one or more authentication codes further include sub-device identification to indicate different applications or different users that share the first device.

12. The method of claim 11, wherein a different communication session is established with the second device for each application or user of the first device having a different sub-device identification.

13. At least one non-transitory computer-readable medium having computer program logic stored thereon, the computer program logic including instructions to cause processors of a first device to:
establish, by a first processor, a secure connection with a second device over a network using a communications protocol;
receive, by the first processor, an identity authentication request from the second device;
pass, by the first processor, the identity authentication request to a second processor located on an authentication chip of the first device;
generate, by the second processor using one or more authentication code functions stored on the authentication chip, one or more authentication codes using a unique serial number of the first device and an authentication key, the unique serial number and the authentication key both stored on the authentication chip;
provide, by the second processor, the one or more generated authentication codes to the first processor; and
send, by the first processor, a response to the second device that includes the one or more generated authentication codes.

14. The at least one computer readable medium of claim 13, wherein the identity authentication request includes a challenge, and the one or more generated authentication codes include a challenge response.

15. The at least one computer readable medium of claim 13, wherein the instructions further include instructions to cause the processors to:
generate, by the second processor, a challenge for the second device, to request authentication of an identity of the second device;
provide the generated challenge to the first processor;
receive, by the first processor, a challenge response from the second device;
provide, by the first processor, the challenge response to the second processor; and
process, by the second processor, the challenge response using the one or more authentication code functions and the authentication key,
wherein authentication of the identity of the second device is successful if the challenge response is correct and is determined to have used a key in accordance with the authentication key of the authentication chip.

16. The at least one computer readable medium of claim 13, wherein the one or more authentication codes further include sub-device identification to indicate different applications or different users that share the first device.

17. The at least one computer readable medium of claim 15, wherein a different communication session is established with the second device for each application or user of the first device having a different sub-device identification.

18. An authentication chip of a device capable of communications with other devices on a network, the authentication chip comprising:
an authentication processor; and
a memory communicably connected to the authentication processor for storing
a unique serial number for the device,
a key, wherein the key is to be written once and never read by a main processor of the device, and
one or more authentication code functions,
wherein the authentication processor is configured to:
receive an authentication request from a main processor of the device, the authentication request received by the main processor from an other device on the network after a secure data transport session was established between the device and the other device;
execute the one or more authentication code functions to generate one or more authentication codes, in response to the authentication request, using the unique serial number and the key; and
provide the one or more generated authentication codes to the main processor to be provided in a response to the other device over the network.

19. The authentication chip of claim 18, wherein the authentication request includes a challenge, and the one or more generated authentication codes include a challenge response.

20. The authentication chip of claim 18, wherein the authentication processor is further configured to:
generate a challenge for the other device to request authentication of an identity of the other device;
provide the generated challenge to the main processor;
receive a challenge response from the main processor, the challenge response received by the main processor from the other device; and
process the challenge response using the one or more authentication code functions and the key,
wherein authentication is successful if the challenge response is correct and is determined to have used a key in accordance with the key of the authentication chip.

21. The authentication chip of claim 18, wherein the authentication chip is embodied in a hardware dongle.

22. The authentication chip of claim 18, wherein the key is initially blank and subsequently written to the authentication chip by a user.

23. The authentication chip of claim 18, wherein the one or more authentication codes further include sub-device identification to indicate different applications or different users that share the device.

24. The authentication chip of claim 23, wherein a different communication session is established with the other device for each application or user of the device having a different sub-device identification.

* * * * *